(12) United States Patent
Minefuji

(10) Patent No.: US 7,957,078 B2
(45) Date of Patent: Jun. 7, 2011

(54) PROJECTION OPTICAL SYSTEM AND PROJECTION TYPE IMAGE DISPLAY DEVICE

(75) Inventor: Nobutaka Minefuji, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/699,657

(22) Filed: Feb. 3, 2010

(65) Prior Publication Data

US 2010/0208364 A1 Aug. 19, 2010

(30) Foreign Application Priority Data

Feb. 13, 2009 (JP) ................................. 2009-031018

(51) Int. Cl.
*G02B 17/00* (2006.01)
(52) U.S. Cl. .......................................... 359/731; 353/99
(58) Field of Classification Search .................. 359/726, 359/727, 730, 731; 353/98, 99
See application file for complete search history.

(56) References Cited

U.S. PATENT DOCUMENTS

| 2,520,633 A | * | 8/1950 | Grey | ............................. 359/731 |
| 7,048,388 B2 | | 5/2006 | Takaura et al. | |
| 7,549,755 B2 | | 6/2009 | Suzuki | |
| 2007/0184368 A1 | | 8/2007 | Nishikawa et al. | |
| 2009/0168031 A1 | * | 7/2009 | Imaoka et al. | .................... 353/99 |
| 2009/0231690 A1 | | 9/2009 | Nishikawa et al. | |

FOREIGN PATENT DOCUMENTS

| JP | A-2004-258620 | 9/2004 |
| JP | A-2006-235516 | 9/2006 |
| JP | A-2007-79524 | 3/2007 |
| JP | A-2007-147970 | 6/2007 |

\* cited by examiner

*Primary Examiner* — Darryl J Collins
(74) *Attorney, Agent, or Firm* — Oliff & Berridge, PLC

(57) ABSTRACT

A projection optical system includes: a refracting optical section composed mainly of a plurality of lenses disposed in order from a reducing side, and having positive power; a first reflecting optical section having a concave reflecting optical surface; and a second reflecting optical section having a convex reflecting optical surface, wherein the projection optical system satisfies the following conditional expression, denoting a focal length of a total system combining the refracting optical section, the first reflecting optical section, and the second reflecting optical section as F, and a focal length of the refracting optical section as FL:

$$0.2 < F/FL < 0.5 \qquad (1).$$

16 Claims, 21 Drawing Sheets

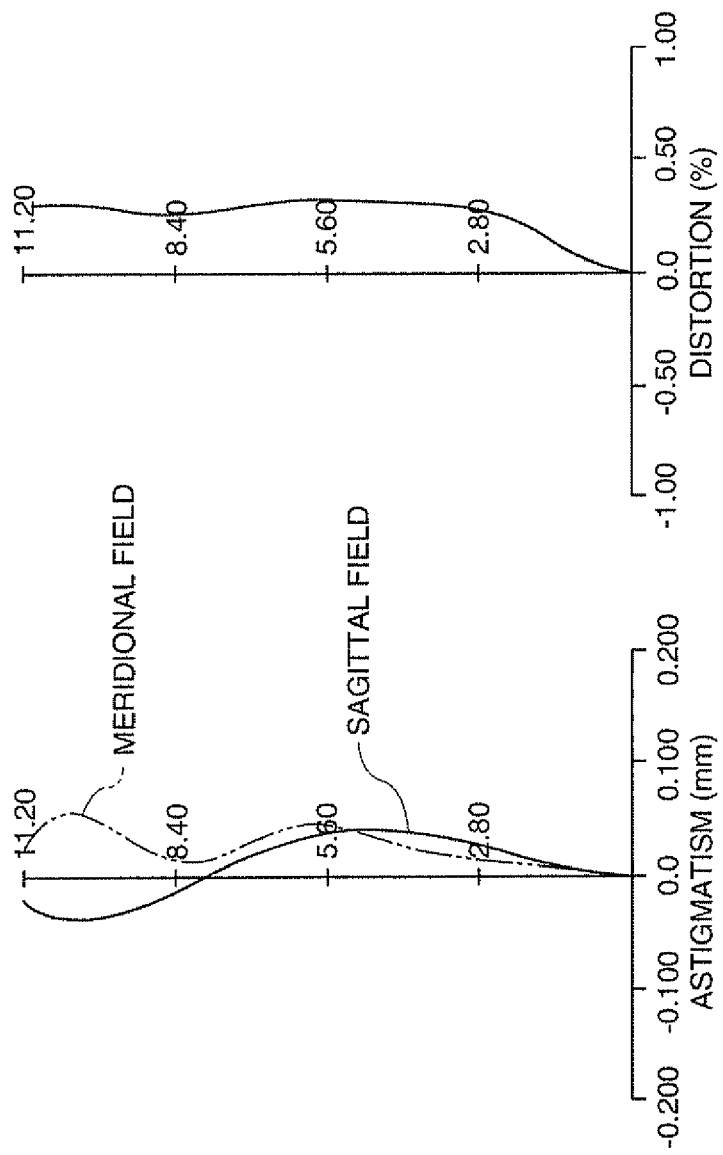

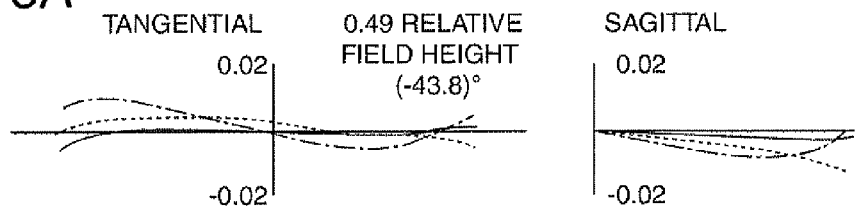
FIG. 5A
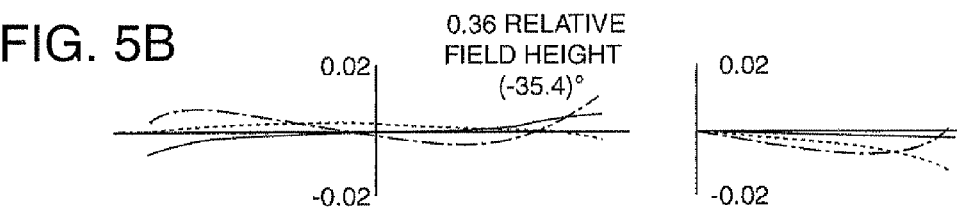
FIG. 5B
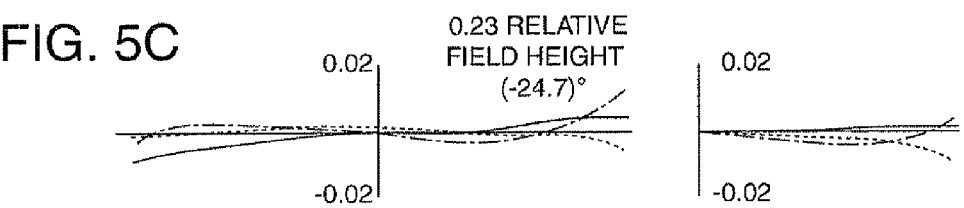
FIG. 5C
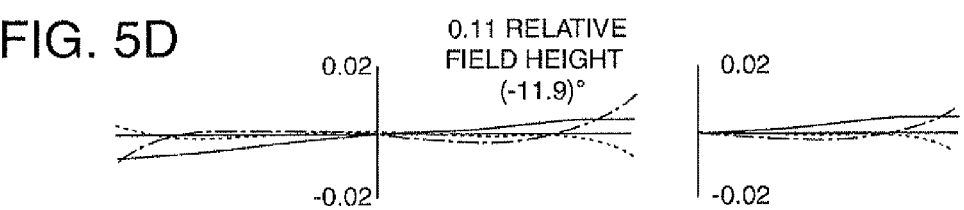
FIG. 5D
FIG. 5

FIG. 6A
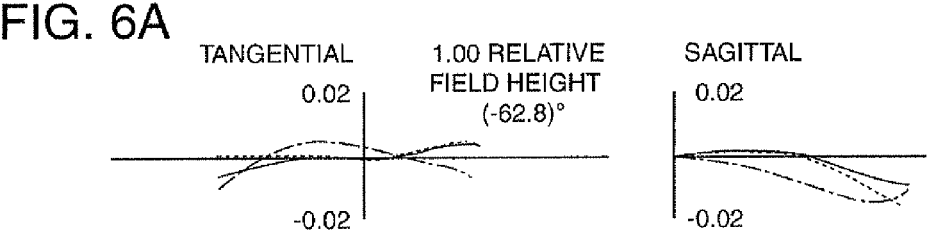
FIG. 6B
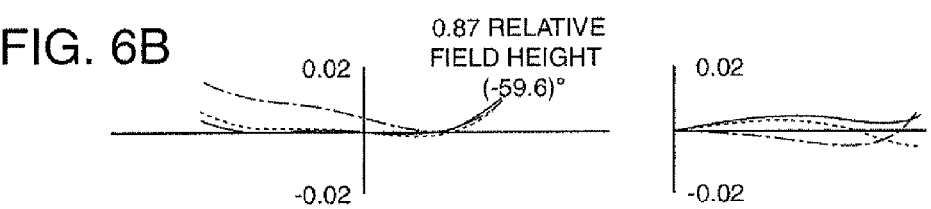
FIG. 6C
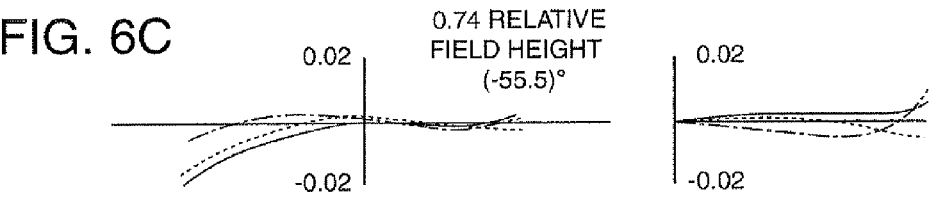
FIG. 6D
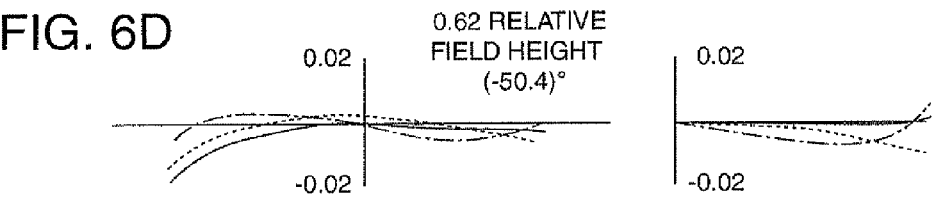
```
------------ 610.0000NM
──────────── 550.0000NM
─ ·· ─ ·· ─  460.0000NM
```
FIG. 6

FIG. 13A
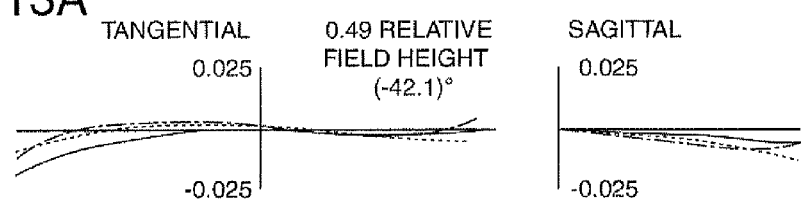
FIG. 13B
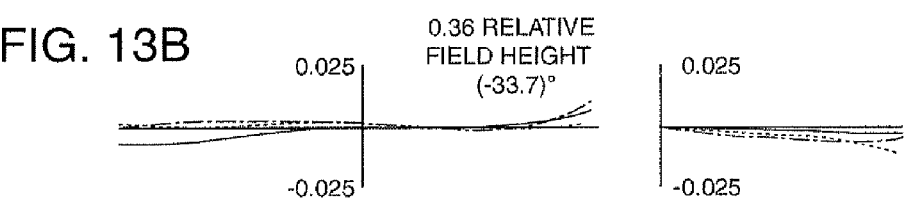
FIG. 13C
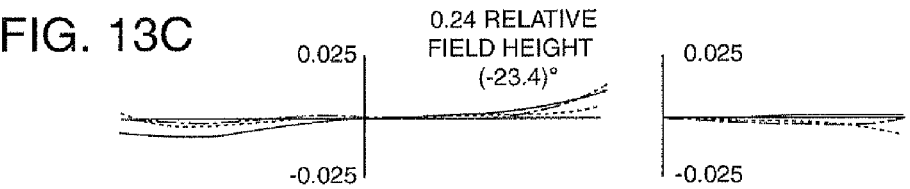
FIG. 13D
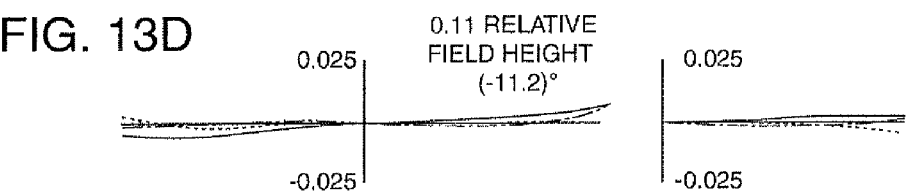
```
---------------- 610.0000NM
———————— 550.0000NM
— — — — — 460.0000NM
```
FIG. 13

FIG. 14A
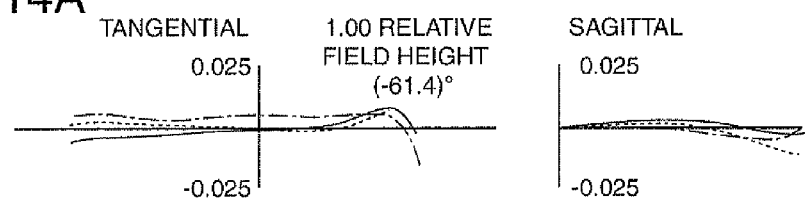
FIG. 14B
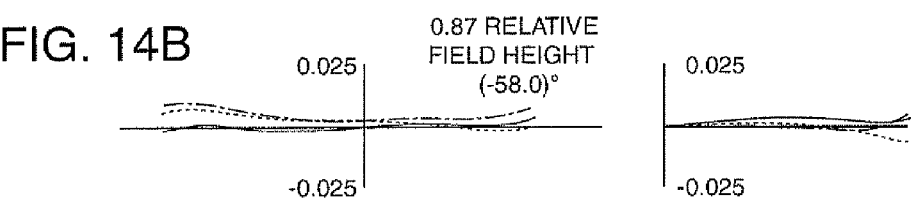
FIG. 14C
FIG. 14D
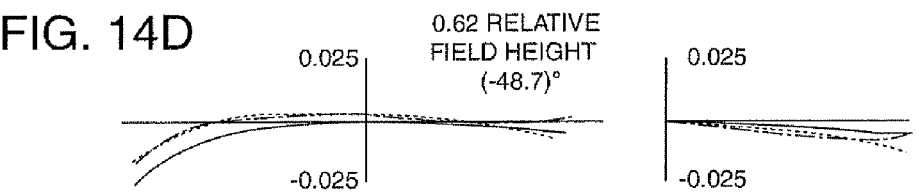
FIG. 14

FIG. 19

FIG. 20A
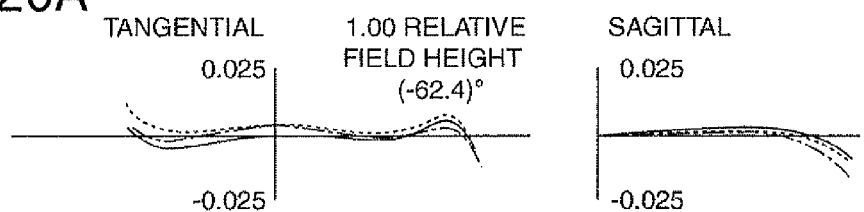
FIG. 20B
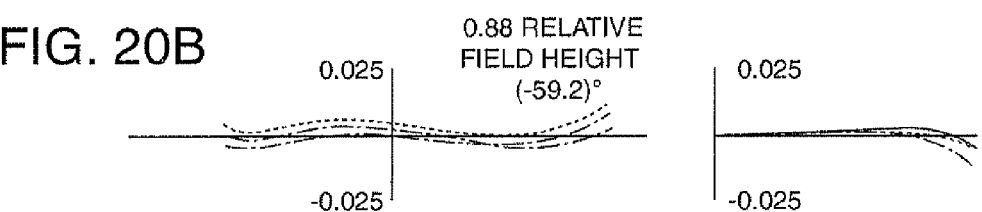
FIG. 20C
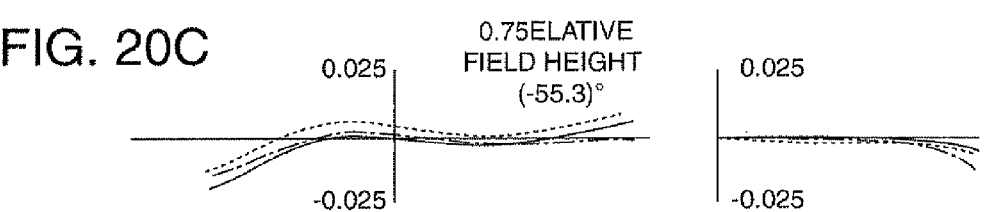
FIG. 20D
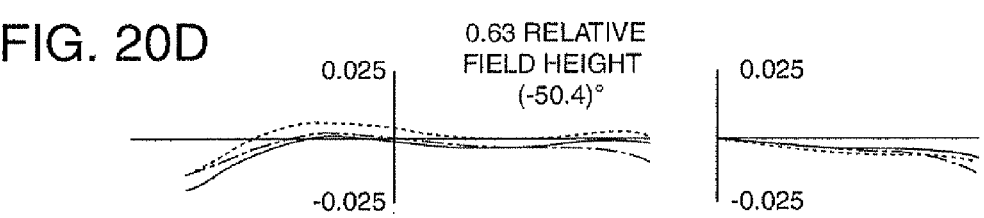
```
------------- 610.0000NM
───────────── 550.0000NM
─────·───────  460.0000NM
```
FIG. 20

PROJECTION OPTICAL SYSTEM AND PROJECTION TYPE IMAGE DISPLAY DEVICE

BACKGROUND

1. Technical Field

The present invention relates to a projection optical system and a projection type image display device equipped with the projection optical system adapted to project an image, which is formed by a liquid crystal panel or the like, on a screen.

2. Related Art

As a projection optical system having a wide angle of view of which a half angle of view is approximately 60 degrees, capable of obtaining a large screen by performing projection at close range, there exists a projection optical system having a refracting optical section composed of a plurality of lenses (see JP-A-2007-147970). However, in the case in which it is attempted to obtain vary wide angle of view only by the function of the refracting optical section, there arises a fault that the lens particularly located on the magnifying side becomes greatly enlarged. Further, in the case in which it is attempted to achieve wide angle of view only by the function of the refracting optical section, a very large number of lenses become necessary for correcting the chromatic aberration of magnification caused by the negative meniscus lens with strong power particularly located on the magnifying side.

As a method of eliminating the fault in the projection optical system having only such a refracting optical section, there is proposed a projection optical system formed of a refracting/reflecting complex optical system using a refracting optical section, which is composed of a plurality of lenses, and a curved reflecting mirror (see JP-A-2006-235516 (Document 2) and JP-A-2007-079524 (Document 3)). Since a reflecting mirror is used as a measure for obtaining a terminal wide angle of view in these refracting/reflecting complex optical systems, there is a feature that the chromatic aberration of magnification described above is hard to occur compared to the projection optical system provided only with the refracting optical section described above.

However, in the projection optical system disclosed in the Document 2, although the very wide angle of view is assured using the refracting optical section and the concave mirror, the curved mirror is very large compared to the size of the lens of the refracting optical section, and the length of the projection optical system is also very large.

Further, in the projection optical system disclosed in the Document 3, in the example of setting the angle of view to be, for example, approximately 60 degrees, although the mirror size is reduced by combining a concave mirror and a convex mirror, the total length of the projection optical system is very large similarly to in the case of the Document 2. Further, the projection optical system is so dark as to have an F number of 3, which is insufficient for an optical system using a transmissive liquid crystal device. Further, since the two mirrors are aspherical, there is significant difficulty in accuracy and assembling.

In view of the above, in the complex optical system of the related art described above, although the wide angle of view can be obtained, there is a fault that it is difficult to shorten the total length, and at the same time, the size of the mirror becomes problematically large. Therefore, although such a complex optical system does not cause a large problem in the case of a model in which a folded structure can be taken such as a rear projector, the growth in size cannot be avoided in the case of a model to which portability is thought to be important such as a front projector.

SUMMARY

Therefore, an advantage of some aspects of the invention is to provide a projection optical system, which is compact, low-cost, and capable of performing close projection with preferable image quality while keeping a wide angle of view.

Another advantage of some aspects of the invention is to provide a projection type image display device equipped with the projection optical system described above.

A projection optical system according to an aspect of the invention includes a refracting optical section composed mainly of a plurality of lenses, and having positive power, a first reflecting optical section having a concave reflecting optical surface, and a second reflecting optical section having a convex reflecting optical surface. The refracting optical section, the first reflecting optical section and the second reflecting optical section are disposed in order from a reducing side. The projection optical system satisfies the following conditional expression, denoting a focal length of a total system combining the refracting optical section, the first reflecting optical section, and the second reflecting optical section as F, and a focal length of the refracting optical section as FL.

$$0.2 < F/FL < 0.5 \tag{1}$$

According to the projection optical system, it is possible that the refracting optical section forms an enlarged image for canceling the aberration to be generated by the two mirrors disposed at the posterior stage, the image light is once focused and then diffused with the positive power of the first reflecting optical section, and then the image light is further diffused with the negative power of the second reflecting optical section. Thus, it becomes possible to project the image, which includes the aberration such as distortion thus reduced, on the screen while shortening the length of the total system to keep the very wide angle of view. In this case, by appropriately distributing the power between the refracting optical section and the first and second reflecting optical sections, thereby simplifying the configuration of the refracting optical section, it becomes possible to avoid the request of the high working accuracy to the first reflecting optical section, and at the same time to reduce the size and so on of the second reflecting optical section while suppressing the cost of the refracting optical section to a low level. Here, the conditional expression 1 represents the condition related to the ratio between the focal length of the total system and the focal length of the refracting optical section. By appropriately distributing the power between the refracting optical section and the first and second reflecting optical sections within the range of the conditional expression 1, the projection optical system of this aspect of the invention can achieve miniaturization of the total system while obtaining the low cost and preferable imaging performance.

It should be noted that in the case of exceeding the upper limit of the conditional expression 1, the focal length of the refracting optical section becomes too short with respect to the focal length of the total system. In this case, the power of each of the lenses in the refracting optical section is increased, and it becomes difficult to suppress the various aberrations to small values.

Further, in the case of underrunning the lower limit of the conditional expression 1, the focal length of the refracting optical section becomes too long with respect to the focal length of the total system, and the necessity of increasing the power of the first and second reflecting optical sections arises in order for obtaining the wide angle of view eventually required. In this case, if the positive power of the first reflecting optical section is increased, the angle of the light beam reflected by the first reflecting optical section becomes deeper. Therefore, the necessity of enlarging the second reflecting optical section arises, which causes disadvantages in miniaturization. In particular, in the first reflecting optical section having the strong positive power, if the concave section becomes too deep, it becomes difficult to assure the necessary surface accuracy.

According to a specific aspect or a view point of the invention, in the projection optical system described above, the refracting optical section is mainly composed of a first lens group having positive power and a second lens group having negative power disposed across a largest interval in the refracting optical section in order from the reducing side, and satisfies the following conditional expression, denoting a focal length of the first lens group as F1, and a focal length of the second lens group as F2.

$$0.0 < |F1/F2| < 0.8 \qquad (2)$$

In this case, the negative second lens group and the positive first lens group are disposed in this order when viewed from the magnifying side, and a configuration of a so-called retro focus lens is taken as a result. Thus, a sufficient back focus on the reducing side and preferable telocentric property can be obtained. Still further, by appropriately distributing the power in the refracting optical section so as to satisfy the conditional expression described above, it is possible to shorten the total length of the refracting optical section, and at the same time, to achieve the preferable performance while keeping the long back focus.

It should be noted that in the case of exceeding the upper limit of the conditional expression 2, the negative power of the second lens group becomes too strong with respect to the positive power of the first lens group. If the power of each of the lenses constituting the second lens group becomes too strong in the manner as described above, in particular the coma aberration and astigmatism are caused, and it becomes difficult to configure the second lens group with a small number of constituents.

Further, in the case of underrunning the lower limit of the conditional expression 2, the negative power of the second lens group becomes too weak with respect to the positive power of the first lens group. In this case, the effect of the retro focus is reduced, and it becomes difficult to suppress the various aberrations to small values while keeping the sufficient back focus.

In particular, it is difficult to manufacture the large-sized aspherical reflecting mirror using glass material, and therefore, such mirror is often manufactured as a mold mirror using a resin material under normal conditions. In the resin mold mirrors, it is possible to freely select the shape thereof such as a rectangular shape besides the aspherical reflecting surface and the circular outer shape similar to the normal glass lens. On the negative side, it has lower surface accuracy compared to the glass spherical lens or the like, or it becomes difficult to align the optical axis with other optical components because of the rectangular shape.

According to another aspect of the invention, the convex reflecting optical surface of the second reflecting optical section is a spherical surface. In this case, by forming the reflecting optical surface as a spherical surface, it becomes easy to process the reflecting optical surface. Therefore, it is possible to manufacture the lens in the same manner as in the normal spherical glass lens, and therefore, it becomes possible to form the reflecting optical surface with high accuracy at low cost, moreover, by taking the same working process as that of the normal lens, high eccentric accuracy due to core alignment can be obtained, and further, it becomes possible to incorporate it in a typical cylindrical lens frame with high accuracy.

In the complex optical system of the refracting optical section and the reflecting optical section of this kind, from the nature of folding the light beam, which is emitted from the refracting optical section, by the first reflecting optical section toward the refracting optical section, the light in the vicinity of the optical axis is shaded by the refracting optical section, and is therefore unavailable. Therefore, it is required to shift the image display element to the position where the optical axis is not included. Since the light beam emitted from the image display element is diffused with distance from the aperture in the refracting optical section, only less than a half of the lens on one side thereof is used as the transmission area on the magnifying side of the refracting optical section. The non-transmission area other than the transmission area is used as the second reflecting optical section for further reflecting the diffused light reflected by the first reflecting optical section, as, for example, described below.

According to still another aspect of the invention, the convex reflecting optical surface of the second reflecting optical section also forms a surface of a lens constituting a part of the refracting optical section. In this case, since the two functions can be provided to one member, the projection optical system can be made compact.

According to still another aspect of the invention, the projection optical system satisfies the following conditional expression, denoting a maximum effective radius of the first reflecting optical section as H1, and a maximum effective radius of the second reflecting optical section as H2.

$$0.4 < H2/H1 < 1.2 \qquad (3)$$

In this case, since the first reflecting optical section and the second reflecting optical section have substantially the same effective radius, or the effective radius of the second reflecting optical section becomes smaller, it becomes easy to put them into the coaxial integrated frame. Here, the conditional expression 3 represents the condition related to the ratio between the maximum effective radius of the first reflecting optical section and the maximum effective radius of the second reflecting optical section. The conditional expression 3 represents the condition for simplifying the frame configuration connecting the refracting optical section, the first reflecting optical section, and the second reflecting optical section in order from the magnifying side.

It should be noted that in the case of exceeding the upper limit of the conditional expression 3, the maximum effective radius of the second reflecting optical section becomes excessively larger than the maximum effective radius of the first reflecting optical section. In this case, since the radius of the second reflecting optical section located between the refracting optical section and the first reflecting optical section becomes larger, the frame configuration becomes complicated, and there arises the necessity of housing the refracting optical section, the first and second reflecting optical sections with respective frames different from each other. Since preparation of a plurality of frames leads to increase in the number of components, disadvantages arise in cost reduction. Further, in the case of bonding the plurality of frames with sizes different from each other, errors become apt to occur easily in view of accuracy, which is not preferable.

In contrast, in the case of underrunning the lower limit of the conditional expression 3, the maximum effective radius of the second reflecting optical section becomes excessively smaller than the maximum effective radius of the first reflecting optical section. In this case, since the second reflecting optical section comes too closer to the focal point of the first reflecting optical section, the sensitivity of the required installation accuracy becomes higher. Further, in the case in which some lenses of the refracting optical section are also used as the second reflecting optical section, such lenses used in common come closer to the first reflecting optical section. Therefore, the common lenses break into the primary imaging dimension of the refracting optical section, which causes a scratch or a dust on the surface of the lens to get into the image, and is therefore undesirable.

According to still another aspect of the invention, at least the first reflecting optical section and the second reflecting optical section are incorporated in a coaxial frame. In this case, degradation of the imaging performance due to the influence of decentering can be prevented. Further, by forming the first and second reflecting optical sections to have a circular circumferential shape similarly to the normal spherical lens, and forming the frame to have a cylindrical shape similarly to the normal refracting type lenses, high accuracy and cost reduction can be achieved. From the viewpoint of enhancing the working accuracy and the assembling accuracy, thereby improving the yield, it is preferable to integrate the lens frame with a simple structure.

According to still another aspect of the invention, the projection optical system satisfies the following conditional expression, denoting a total length of the refracting optical section as TL, and a distance between the refracting optical section and the first reflecting optical section as DM.

$$0.3 < DM/TL < 1.0 \quad (4)$$

Here, the conditional expression 4 represents the condition related to the ratio between the total length of the refracting optical section and the air space from the refracting optical section to the first reflecting optical section, and the condition related to the size of the first reflecting optical section and provision of workability thereof. By appropriately providing the distance between the refracting optical section and the first reflecting optical section within the range of the conditional expression 4, the miniaturization of the first reflecting optical section can be achieved, and it becomes possible to prevent the required working accuracy from being raised by limiting the power.

It should be noted that in the case of exceeding the upper limit of the conditional expression 4, the distance between the refracting optical section and the first reflecting optical section becomes too long. In this case, the total system becomes to have an elongated frame structure, and the effective radius of the reflecting optical surface becomes larger, which is undesirable in miniaturization.

In contrast, in the case of underrunning the lower limit of the conditional expression 4, the distance between the refracting optical section and the first reflecting optical section becomes too short. In this case, since the positive power of the reflecting optical surface is increased, the required working accuracy rises in order for reducing the variation in the performance. Further, since the light paths of the light beams toward the respective image heights become overlapped with each other when reflected by the first reflecting optical section if the distance between the refracting optical section and the first reflecting optical section becomes shorter, it becomes difficult to efficiently correct the distortion while keeping the astigmatism preferable.

According to still another aspect of the invention, the reducing side of the refracting optical section is configured to be substantially telecentric.

Further, in view of the above technical problems, a projection type image display device according to another aspect of the invention includes the projection optical system described above, and an image forming optical section disposed on the light path of the refracting optical section at an anterior stage of the refracting optical section.

According to the projection type image display device described above, since the projection optical system described above is provided, it becomes possible to project the image, which includes the aberration such as distortion thus reduced, on the screen while keeping the wide angle of view. Further, by miniaturizing the total system, the compact projection type image display device can be achieved.

BRIEF DESCRIPTION OF THE DRAWINGS

The invention will be described with reference to the accompanying drawings, wherein like numbers reference like elements.

FIG. 4A is an astigmatism diagram on the reducing side, and FIG. 4B is a distortion diagram.

FIGS. 5A through 5D are lateral aberration diagrams at wavelengths of 610 nm, 550 nm, and 460 nm in the respective angles of view on the reducing side.

FIGS. 6A through 6D are lateral aberration diagrams at wavelengths of 610 nm, 550 nm, and 460 nm in the respective angles of view on the reducing side.

FIGS. 13A through 13D are lateral aberration diagrams at wavelengths of 610 nm, 550 nm, and 460 nm in the respective angles of view on the reducing side.

FIGS. 14A through 14D are lateral aberration diagrams at wavelengths of 610 nm, 550 nm, and 460 nm in the respective angles of view on the reducing side.

FIGS. 20A through 20D are lateral aberration diagrams at wavelengths of 610 nm, 550 nm, and 460 nm in the respective angles of view on the reducing side.

DESCRIPTION OF EXEMPLARY EMBODIMENTS

First Embodiment

Hereinafter, a projection type image display device according to a first embodiment of the invention will be explained with reference to, for example, FIGS. 1, 2, 3, and 8.

Figure 1:
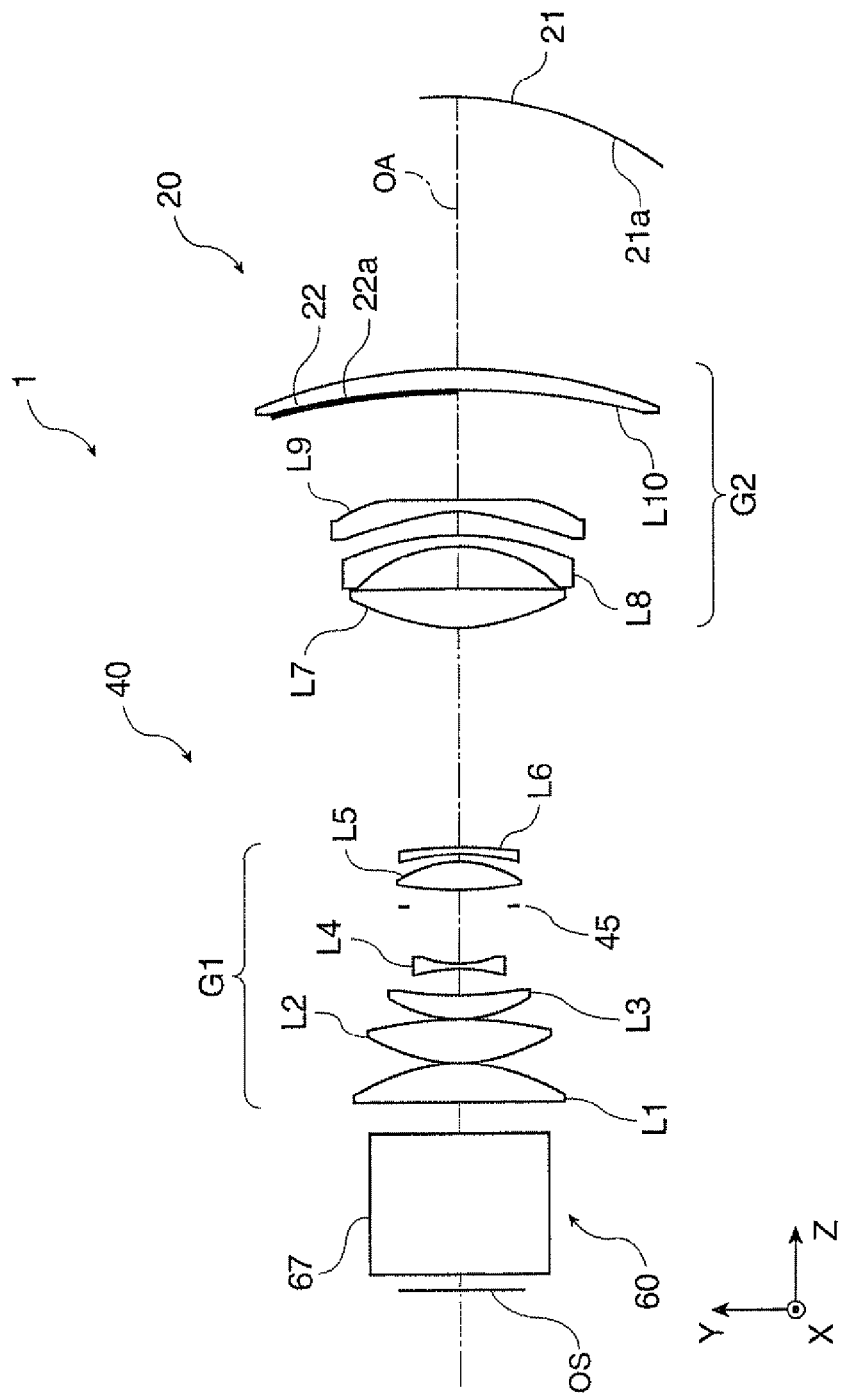
FIG. 1 is a diagram for explaining a configuration of a substantial part of a projection type image display device according to a first embodiment.
Figure 2:
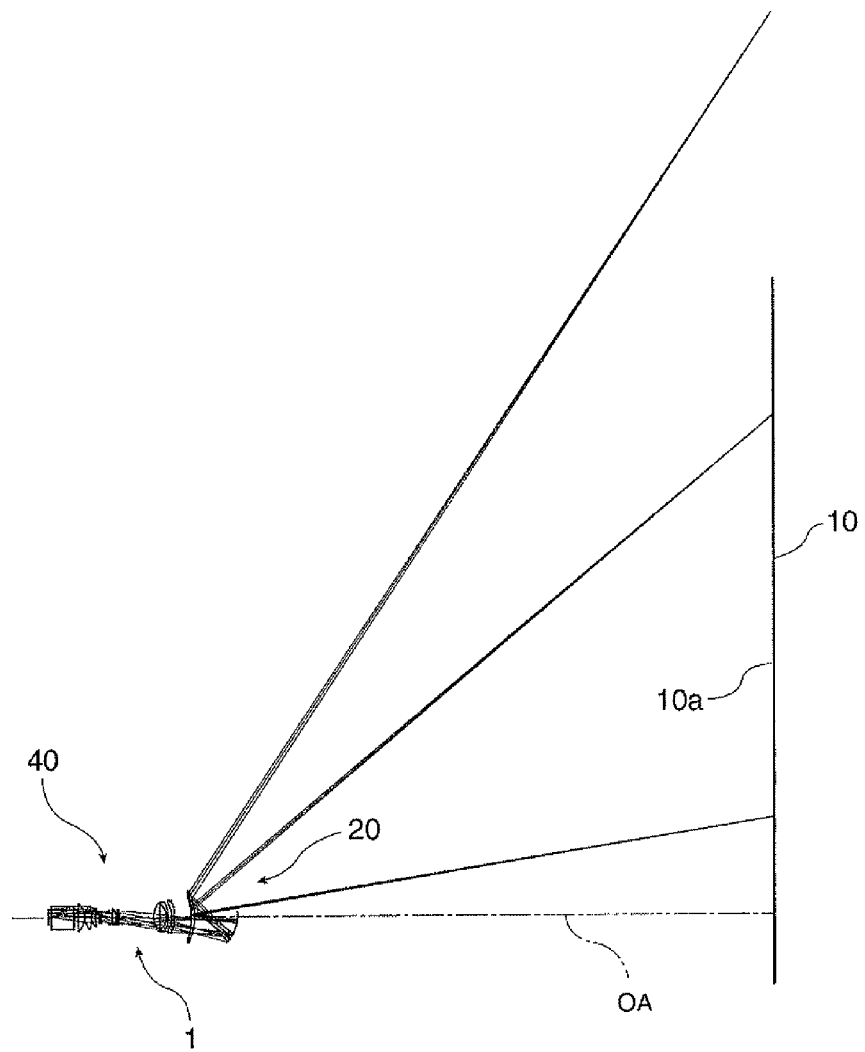
FIG. 2 is a diagram showing a state of a light beam projected on a screen by the projection type image display device shown in FIG. 1.

As shown in FIG. 2, the projection type image display device 100 is disposed in a space located in front and on the lower side of the projection surface 10a of a screen 10, and is provided with a projection optical system 1 and an image forming optical section 60. The projection optical system 1 is an enlarged projection optical system, and the image forming optical section 60 forms an image to be enlargedly projected by the projection optical system 1. It should be noted that in, for example, FIGS. 1 and 3, only a cross dichroic prism 67, which is a part of the image forming optical section 60, is shown, and the remaining part thereof is omitted.

1. Explanation of Projection Optical System

As shown in, for example, FIGS. 1 and 2, the projection optical system 1 is a refracting/reflecting complex optical system for projecting an image, which is located on an object surface OS, on the screen 10 as an enlarged image, and is provided with a refracting optical section 40 and an output optical section 20.

The refracting optical section 40 in the projection optical system 1 is disposed on the exit side of the image forming optical section 60, and is provided with a first lens group G1 as a refracting lens group, a second lens group G2, which is similarly a refracting lens group, and an aperture 45. The first and second lens groups G1, G2 are disposed in this order coaxially around the optical axis OA from the object side (the reducing side), on which the image forming optical section 60 is located, toward the projection side (the magnifying side), on which the screen 10 is located. It should be noted that as shown in FIG. 1 and so on, between the first lens group G1 and the second lens group G2, there is disposed the largest interval in the refracting optical section 40.

Hereinafter, a specific lens configuration of the refracting optical section 40, and so on will be explained.

In the refracting optical section 40, the first lens group G1 is composed of a first lens L1, a second lens L2, a third lens L3, a fourth lens L4, a fifth lens L5, and a sixth lens L6. The second lens group G2 is composed of a seventh lens L7, an eighth lens L8, a ninth lens L9, and a tenth lens L10.

The lenses L1 through L6 of the first lens group G1 are disposed in order from the first lens L1 to the sixth lens L6 in the direction from the object surface OS side (on the side of the object and on the lower side of the screen 10) as the reducing side towards the projection surface 10a side (on the projection side in front and on the lower side of the screen 10) as the magnifying side. The lenses L7 through L10 of the second lens group G2 are also disposed in order from the seventh lens L7 to the tenth lens L10 in the direction from the reducing side toward the magnifying side. Here, the optical axis of the lenses L1 through L10, namely the optical axis OA of the refracting optical section 40, is disposed perpendicularly to the projection surface 10a of the screen 10. The aperture 45 is disposed between the fourth lens L4 of the first lens group G1 and the fifth lens L5 thereof.

Among the constituent lenses of the refracting optical section 40, the first lens L1 is a plano-convex lens having a flat surface on the entrance side and a convex surface on the exit side. Further, the second lens L2 is a biconvex lens. Still further, the third lens L3 is a meniscus lens having a convex surface on the entrance side and a concave surface on the exit side. Further, the fourth lens L4 is a biconcave lens. Still further, the fifth lens L5 is an aspheric biconvex lens. Still further, the sixth lens L6 is a meniscus lens having a concave surface on the entrance side and a convex surface on the exit side. The seventh lens L7 is a biconvex lens. Further, the eighth lens L8, the ninth lens L9, and the tenth lens L10 are each a meniscus lens having a concave surface on the entrance side and a convex surface on the exit side. Among these lenses, the ninth lens L9 is an aspherical lens. According to the configuration of the lenses L1 through L10 described above, the first lens group G1 has positive power, and the second lens group G2 has negative power. The arrangement of the lenses L1 through L10 is adjusted so that the optimum enlarged projection on the screen 10 can be performed in relation to the shape, arrangement, and so on of the output optical section 20 as shown in FIG. 1 and so on.

Figure 3:
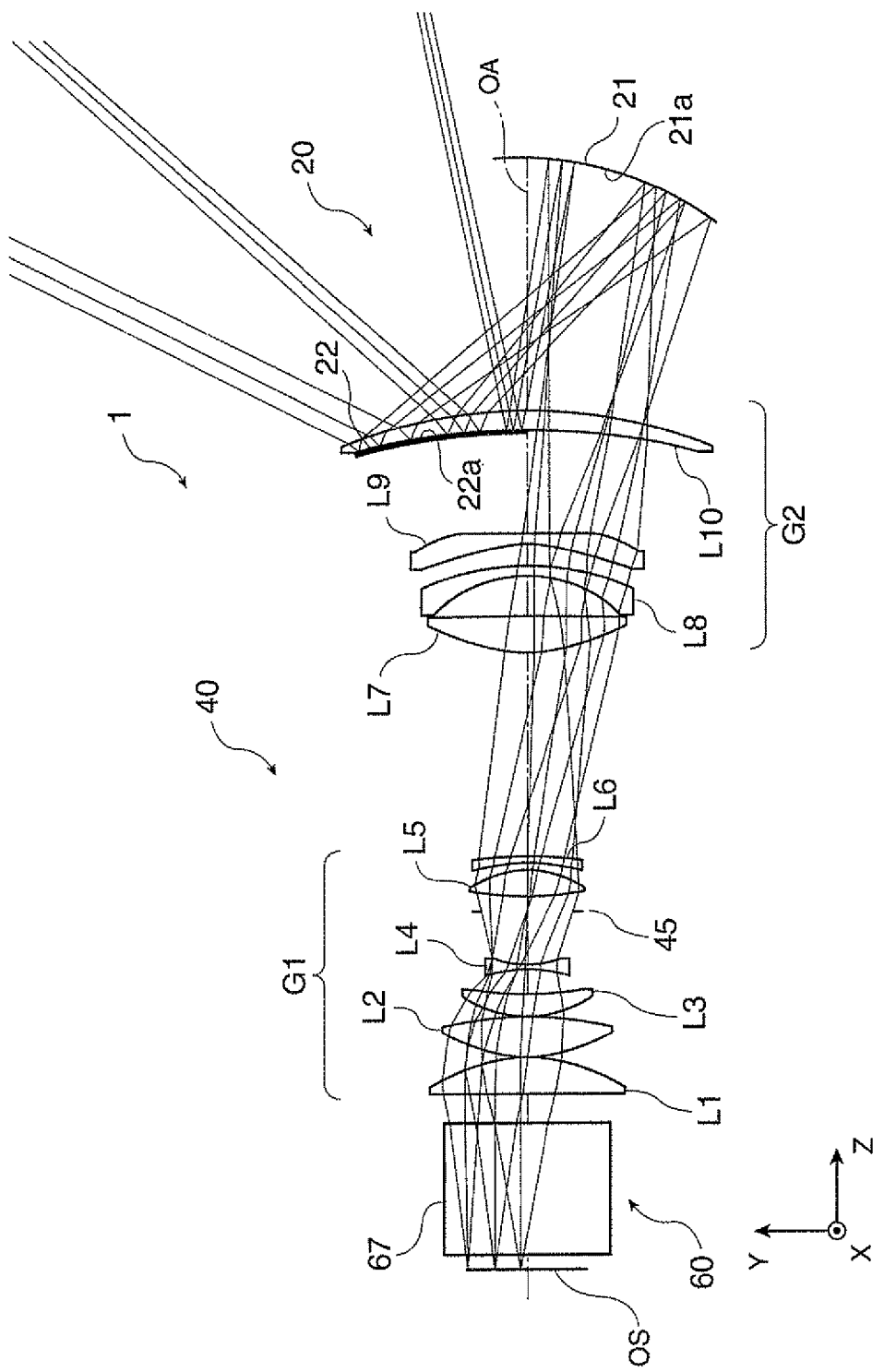
FIG. 3 is an enlarged view of the periphery of the projection optical system shown in FIG. 2.

The refracting optical section 40 is configured so that the object surface OS side thereof becomes substantially telecentric. Further, between the first lens L1 as the anterior end of the refracting optical section 40 and the object surface OS on which a liquid crystal panel is disposed, there is disposed the cross dichroic prism 67 for combining the images of three colors. It should be noted that the object surfaces on which the other two liquid crystal panels are to be disposed, although omitted from the drawing, have an equivalent, namely conjugated arrangement with respect to the object surface OS shown in the drawing. In FIG. 3 and so on, a light beam with certain spread centered on a principal ray perpendicular to the object surface OS and parallel to the optical axis OA is emitted from each of object points on the object surface OS, and is transmitted through the refracting optical section 40, reflected by the output optical section 20 and so on, and then projected on the projection surface 10a of the screen 10.

The output optical section 20 is disposed on the exit side of the refracting optical section 40, and is provided with a first curved mirror 21 as a first reflecting optical section and a second curved mirror 22 as a second reflecting optical section.

As shown in FIG. 1, the first and second curved mirrors 21, 22 are disposed coaxially around the optical axis OA. The first curved mirror 21 is a rotationally symmetrical surface having the optical axis OA as the axis of symmetry, and has a reflecting optical surface 21a as a concave aspherical surface having positive power. The upper portion (the portion located in the +Y direction from the optical axis OA) of the first curved mirror 21 from the optical axis OA interferes with the light beams reflected by the second curved mirror 22, and therefore is removed by cutting. It should be noted that by partially leaving the shape of the circumference, the optical axis OA can easily be determined. The second curved mirror 22 is a back-surface mirror attached with a lens, which is a rotationally symmetrical surface having the optical axis OA as the axis, and has a reflecting optical surface 22a (the portion illustrated by a thick line in FIG. 1 and so on), which is a convex spherical surface having negative power, on the upper half thereof (the portion located in the +Y direction from the XZ plane passing through the optical axis OA) from the optical axis OA. The second curved mirror 22 is integrated with a part of the tenth lens L10 on the most magnifying side of the refracting optical section 40 described above. The reflecting optical surface 22a of the second curved mirror 22 also forms the reducing side surface of the tenth lens L10, and is formed as a back-surface mirror using the tenth lens L10. In other words, the lower half portion (the portion located in the −Y direction from the XZ plane passing through the optical axis OA) of the tenth lens L10 from the optical axis OA functions as the lens constituting the refracting optical section 40, and the upper half portion of the tenth lens L10 from the optical axis OA functions as the convex mirror constituting the output optical section 20. It should be noted that the second curved mirror 22 is formed by coating the reducing side surface of the tenth lens L10 with a reflecting material such as aluminum.

Figure 8:
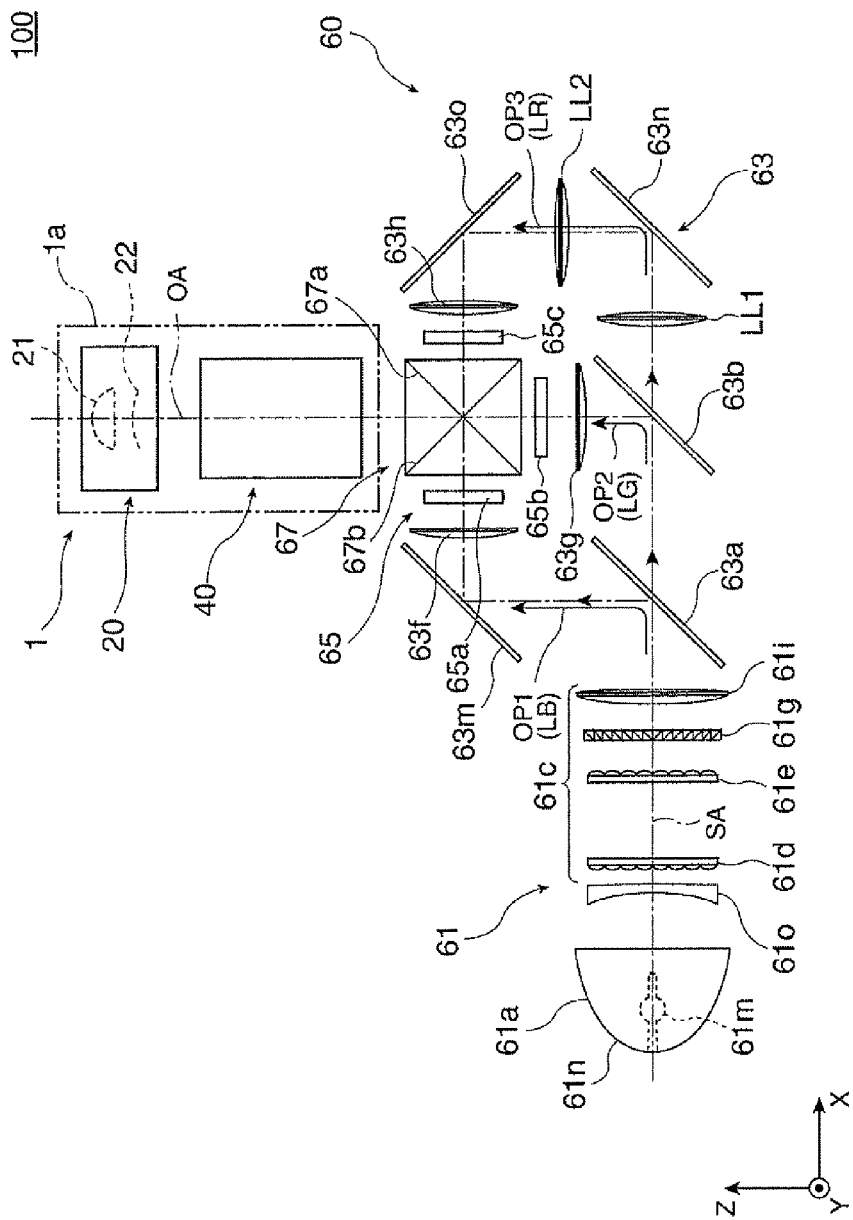
FIG. 8 is a conceptual diagram for explaining a configuration of the projection type image display device according to the first embodiment.
Figure 9:
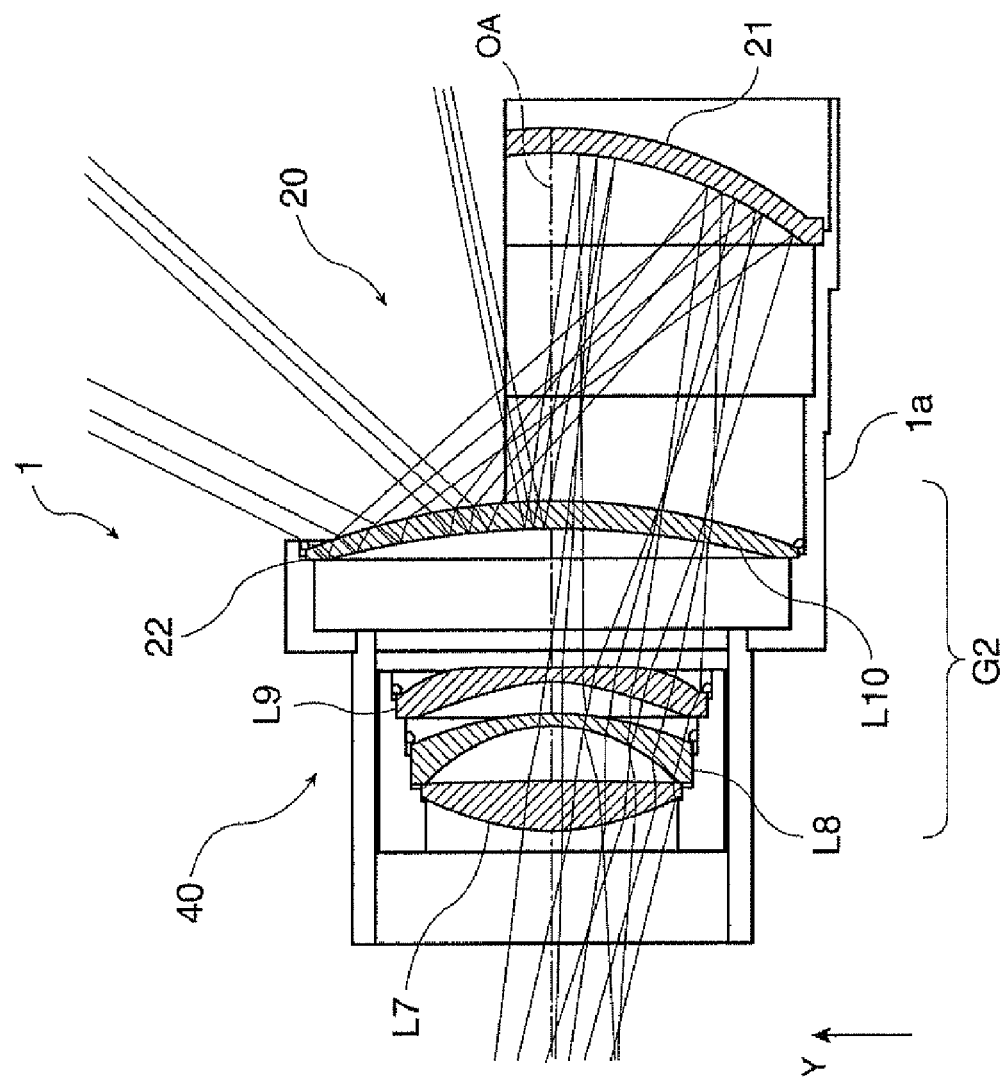
FIG. 9 is a cross-sectional diagram for explaining a frame configuration of the projection optical system shown in FIG. 1.

The first and second curved mirrors 21, 22 have the respective reflecting optical surfaces 21a, 22a with substantially the same effective radius, and are housed in a coaxial integrated frame 1a as shown in FIGS. 8 and 9. It should be noted that FIG. 9 is a cross-sectional diagram of a frame configuration of the second lens group G2 of the refracting optical section 40, and the first and second curved mirrors 21, 22.

The frame 1a for fixing the first and second curved mirrors 21, 22 is manufactured based on optical data. The frame 1a has a coaxial cylindrical shape corresponding to the effective radius of the reflecting optical surfaces 21a, 22a of the first and second curved mirrors 21, 22. On the magnifying side of the frame 1a from the second curved mirror 22, a +Y direction half of the cylinder from the optical axis OA is removed by cutting so as not to block the light diffused from the second curved mirror 22. Further, the frame 1a aligns the optical axis OA with high accuracy with reference to the outer circumferences left to the first and second curved mirrors 21, 22.

The curved mirror 21 reflects the projection light, which is emitted from the image forming optical section 60, namely the object side toward the lower side of the projection surface 10a of the screen 10, toward the second curved mirror 22 located on the upper side and the object side viewed from the first curved mirror 21. The second curved mirror 22 further reflects the reflected light to emit it toward the projection surface 10a of the screen 10 located on the upper side thereof.

Hereinafter, configuration conditions of the projection optical system 1 according to the present embodiment will be explained.

Firstly, the projection optical system 1 according to the present embodiment satisfies the following conditional expression, denoting the focal length of the total system combining the refracting optical section 40, the first curved mirror 21, and the second curved mirror 22, namely the focal length of the projection optical system 1, as F, and the focal length of the refracting optical section 40 as FL.

$$0.2 < F/FL < 0.5 \quad (1)$$

Here, the conditional expression 1 represents the condition related to the ratio between the focal length F of the total system, namely the projection optical system 1, and the focal length FL of the refracting optical section 40. By appropriately distributing the power between the refracting optical section 40 and the first and second curved mirrors 21, 22 within the range of the conditional expression 1, the projection optical system with a wide angle of view achieving the miniaturization of the total system while obtaining the preferable imaging performance at low cost is obtained.

It should be noted that in the case in which the value of F/FL is larger than the upper limit of 0.5 of the conditional expression 1, the focal length FL of the refracting optical section becomes too short with respect to the focal length F of the total system. On this occasion, a certain level of the angle of view can be covered by the refracting optical section 40, and therefore, the load on the first and second mirrors 21, 22 is reduced. However, the power of each of the lenses in the refracting optical section 40 is increased, and it becomes difficult to suppress the various aberrations to small values. Therefore, it becomes quite difficult to simplify the lens configuration of the refracting optical section 40, which is not preferable in the cost reduction.

Further, in the case in which the value of F/FL is smaller than the lower limit of 0.2 of the conditional expression 1, the focal length FL of the refracting optical section 40 becomes too long with respect to the focal length F of the total system. In other words, the angle of view in the refracting optical section 40 becomes narrower, and it becomes necessary to increase the power of the first and second curved mirrors 21, 22 in order for obtaining the wide angle of view required eventually. In order for increasing the power for getting wider angle of view by the first and second curved mirrors 21, 22, it is required for the first curved mirror 21 to increase the positive power of the reflecting optical surface 21a thereof, and for the second curved mirror 22 to similarly increase the negative power of the reflecting optical surface 22a. If the positive power of the first curved mirror 21 is thus increased, the angle of the light beam reflected by the first curved mirror 21 becomes deeper. Therefore, the necessity of enlarging the second curved mirror 22 arises, which causes disadvantages in miniaturization. Further, if the curvature radius of the reflecting optical surfaces 21a, 22a becomes smaller, the manufacturing sensitivity, namely the required accuracy, is increased, which is not preferable.

Further, the projection optical system 1 according to the present embodiment satisfies the following conditional expression, denoting the focal length of the first lens group G1 as F1, and the focal length of the second lens group G2 as F2 in the refracting optical section 40.

$$0.0 < |F1/F2| < 0.8 \quad (2)$$

In this case, the negative second lens group G2 and the positive first lens group G1 are disposed in this order when viewed from the magnifying side, and a configuration of a so-called retro focus lens is taken as a result. By appropriately configuring the first and second lens groups G1, G2 within the range of the conditional expression 2, the refracting optical section 40 is made to have low aberration with a small number of lenses. Further, a sufficient back focus on the reducing side and preferable telecentric property are obtained. Still further, by appropriately distributing the power in the refracting optical section 40 so as to satisfy the conditional expression 2 described above, it is possible to shorten the total length of the refracting optical section 40, and at the same time, to achieve the preferable imaging performance while keeping the long back focus.

It should be noted that in the case in which the value of |F1/F2| is larger than the upper limit of 0.8 of the conditional expression 2, the negative power of the second lens group G2 becomes too strong with respect to the positive power of the first lens group G1. If the power of the second lens group G2, namely the power of each of the lenses constituting the second lens group G2, becomes too strong in the manner as described above, in particular the coma aberration and astigmatism are caused, and it becomes difficult to configure the second lens group G2 with a small number of constituents.

Further, in the case in which the value of |F1/F2| is equal to the lower limit of 0.0 of the conditional expression 2, the negative power of the second lens group G2 becomes too weak with respect to the positive power of the first lens group G1. Thus, the effect of the retro focus is reduced, and it becomes difficult to suppress the various aberrations to small values while keeping the sufficient back focus.

Further, the projection optical system 1 according to the present embodiment satisfies the following conditional expression, denoting the maximum effective radius of the first curved mirror 21 as H1, and the maximum effective radius of the second curved mirror 22 as H2.

$$0.4 < H2/H1 < 1.2 \tag{3}$$

Here, the conditional expression 3 represents the condition related to the ratio between the maximum effective radius H1 of the first curved mirror 21 and the maximum effective radius H2 of the second curved mirror 22. The conditional expression 3 represents a condition for simplifying the frame configuration of a lens tube sequentially connecting the refracting optical section 40, the first curved mirror 21, and the second curved mirror 22 in this order from the magnifying side. By adopting the configuration of the first and second curved mirrors 21, 22 within the range of the conditional expression 3, the first curved mirror 21 once focuses the light and then diffuses the light with the strong positive power of the first curved mirror 21 without degrading the aberration, which is corrected to be preferable by the refracting optical section 40. Further, since the light is further diffused by the negative power of the second curved mirror 22, the image with little distortion is created on the screen 10. Further, since the second curved mirror 22 can be prevented from becoming too large, it becomes easy to install the second curved mirror 22.

It should be noted that in the case in which the value of H2/H1 is larger than the upper limit of 1.2 of the conditional expression 3, the maximum effective radius H2 of the second curved mirror 22 becomes excessively larger than the maximum effective radius H1 of the first curved mirror 21. In this case, since the radius of the second curved mirror 22 located between the refracting optical section 40 and the first curved mirror 21 becomes larger, the frame configuration becomes complicated, and there arises the necessity of housing the refracting optical section 40, the first and second curved mirrors 21, 22 with respective frames different from each other. Since preparation of a plurality of frames leads to increase in the number of components, disadvantages arise in cost reduction. Further, in the case of bonding the plurality of frames with sizes different from each other, errors become apt to occur easily in view of accuracy, which is not preferable.

In contrast, in the case in which the value of H2/H1 is smaller than the lower limit of 0.4 of the conditional expression 3, the maximum effective radius H2 of the second curved mirror 22 becomes excessively smaller than the maximum effective radius H1 of the first curved mirror 21. In this case, although it is preferable in the frame configuration that the difference in the effective radius between the refracting optical section 40 and the first and second curved mirrors 21, 22 is reduced, since the second curved mirror 22 comes too close to the focal point of the first curved mirror 21, the sensitivity of the required installation accuracy becomes higher. Further, in the case of the present embodiment, since the tenth lens L10, which is a part of the refracting optical section 40 is also used as the second curved mirror 22, reduction of the radius of the second curved mirror 22 causes the tenth lens L10, which is a lens used in common, to come closer to the first curved mirror 21. Therefore, the tenth lens L10 is made to break into the surface of the primary imaging plane of the refracting optical section 40, which causes a scratch or a dust on the surface of the tenth lens L10 to get into the image, and is therefore undesirable.

Further, the projection optical system 1 according to the present embodiment satisfies the following conditional expression, denoting the total length of the refracting optical section 40 as TL, and the distance between the refracting optical section 40 and the first curved mirror 21 as DM.

$$0.3 < DM/TL < 1.0 \tag{4}$$

Here, the conditional expression 4 represents the condition related to the ratio between the total length TL of the refracting optical section 40 and the distance DM (air space) from the refracting optical section 40 to the first curved mirror 21, and the condition related to the size of the first curved mirror 21 and provision of workability thereof. By arranging the refracting optical section 40 and the first curved mirror 21 within the range of the conditional expression 4, an appropriate distance between the refracting optical section 40 and the first curved mirror 21 is provided, thereby achieving miniaturization of the first curved mirror 21, and the required working accuracy is reduced by limiting the power.

It should be noted that in the case in which the value of DM/TL is larger than the upper limit of 1.0 of the conditional expression 4, the distance DM between the refracting optical section 40 and the first curved mirror 21 becomes excessively longer than the total length TL of the refracting optical section 40. In this case, although it is possible to weaken the positive power of the first curved mirror 21, the total system becomes to have an elongated frame structure, and the effective radius of the reflecting optical surface 21a of the first curved mirror 21 is enlarged, which is undesirable in miniaturization.

In contrast, in the case in which the value of DM/TL is smaller than the lower limit of 0.3 of the conditional expression 4, the distance DM between the refracting optical section 40 and the first curved mirror 21 becomes excessively shorter than the total length TL of the refracting optical section 40. In this case, although the effective radius of the reflecting optical surface 21a of the first curved mirror 21 can be made smaller, which is advantageous in miniaturization, since the positive power of the reflecting optical surface 21a is increased, the required working accuracy becomes higher in order for reducing the variation in the performance. Further, since the light paths of the light beams toward the respective image heights become overlapped with each other when reflected by the first curved mirror 21 if the distance DM between the refracting optical section 40 and the first curved mirror 21 becomes shorter, it becomes difficult to efficiently correct the distortion while keeping the astigmatism preferable.

2. Specific Example of Projection Optical System

Table 1 shows lens data and so on of a specific example of the projection optical system 1. In the upper part of Table 1, "SURFACE NUMBER" denotes the number assigned to each of the surfaces of the lenses in order from the object surface OS side. Further, "R" represents the curvature radius, and "D" represents the lens thickness or the air space from the subsequent surface. Further, "Nd" represents the refractive index in the d-line of the lens material, and "vd" represents the Abbe number in the d-line of the lens material.

TABLE 1

| SURFACE NUMBER | | R | D | Nd | vd | |
|---|---|---|---|---|---|---|
| 0 | | ∞ | 3.000 | | | IMAGE DISPLAY ELEMENT |
| 1 | | ∞ | 25.750 | 1.51633 | 64.14 | PRISM |
| 2 | | ∞ | 6.000 | | | |
| 3 | | ∞ | 7.000 | 1.53172 | 48.84 | |
| 4 | | −32.444 | 0.200 | | | |
| 5 | | 30.025 | 8.000 | 1.49700 | 81.54 | |
| 6 | | −68.297 | 0.100 | | | |
| 7 | | 21.238 | 4.500 | 1.48749 | 70.44 | |
| 8 | | 69.618 | 4.715 | | | |
| 9 | | −29.423 | 1.200 | 1.84666 | 23.78 | |
| 10 | | 20.727 | 10.390 | | | |
| APERTURE | | ∞ | 3.000 | | | |
| 12 | * | 49.790 | 5.200 | 1.54814 | 45.82 | |
| 13 | * | −17.122 | 1.269 | | | |
| 14 | | −41.162 | 1.400 | 1.80611 | 40.73 | |
| 15 | | −75.319 | 40.718 | | | |
| 16 | | 37.349 | 7.000 | 1.67003 | 47.20 | |
| 17 | | −851.389 | 7.985 | | | |
| 18 | | −24.367 | 1.800 | 1.80518 | 25.46 | |
| 19 | | −49.195 | 4.561 | | | |
| 20 | * | −23.107 | 2.000 | 1.53116 | 56.05 | |
| 21 | * | 125.422 | 20.213 | | | |
| 22 | | −126.030 | 4.000 | 1.51680 | 64.20 | |
| 23 | | −91.621 | 50.000 | | | |
| 24 | * | −54.765 | −50.000 | | | FIRST REFLECTING SURFACE |
| 25 | | −91.621 | −4.000 | 1.15680 | 64.20 | |
| 26 | | −126.030 | 4.000 | 1.15680 | 64.20 | SECOND REFLECTING SURFACE |
| 27 | | −91.621 | 700.000 | | | |
| 28 | | ∞ | 0.000 | | | SCREEN |

| ASP | k | A04 | A06 | A08 | A10 | A12 |
|---|---|---|---|---|---|---|
| R12 | 0.00000E+00 | −6.53174E−06 | −1.43929E−08 | 3.91225E−11 | 0.00000E+00 | 0.00000E+00 |
| R13 | −7.14101E−01 | −6.83594E−08 | −1.67489E−08 | 0.00000E+00 | 0.00000E+00 | 0.00000E+00 |
| R20 | −1.00000E+00 | 4.70249E−05 | −1.26636E−07 | 2.36198E−10 | −2.19681E−13 | 8.69392E−17 |
| R21 | −1.00000E+00 | −2.58294E−05 | −1.27087E−08 | 2.78096E−11 | 0.00000E+00 | 0.00000E+00 |
| R24 | −5.05675E−00 | 1.72731E−07 | −2.42040E−10 | 2.65250E−13 | −1.93582E−16 | 5.13394E−20 |

In the present specific example, although the lenses L1 through L10 are each basically formed of spherical surfaces, the entrance and exit surfaces (the 12th surface and the 13th surface in Table 1) of the fifth lens L5 and the entrance and exit surfaces (the 20th surface and 21st surface in Table 1) of the ninth lens L9 are each formed as an aspherical surface as described above. Further, the reflecting optical surface (the 24th surface in Table 1) of the first curved mirror 21 is also formed as an aspherical surface as described above. The displacement x from the surface peak in the direction of the optical axis OA in each of these aspheric shapes can be represented by the following formula, denoting the inverse of a paraxial curvature radius as c, the height from the optical axis OA as h, a conic coefficient as k, and higher-order aspheric surface coefficients as A04 through A12.

$$x = \frac{c \cdot h^2}{1 + \sqrt{1 - (1+k) \cdot c^2 \cdot h^2}} + A04 \cdot h^4 + A06 \cdot h^6 + A08 \cdot h^8 + A10 \cdot h^{10} + A12 \cdot h^{12}$$

In the case of the present specific example, the respective coefficients "k" and "A04" through "A12" in the aspheric formula described above are as shown in the lower part of Table 1.

Table 2 shows specific examples of the conditional expressions 1 through 4 described above.

TABLE 2

| F/FL | 0.312 |
|---|---|
| |F1/F2| | 0.517 |
| H2/H1 | 0.912 |
| DM/TL | 0.370 |

FIG. 4A is an astigmatism diagram on the reducing side, and FIG. 4B is a distortion diagram. As shown in FIGS. 4A and 4B, it is understood that an amount of astigmatism and an amount of distortion each have a sufficiently small and flat field, and that a preferable performance with little image distortion can be obtained.

FIGS. 5A through 5D and 6A through 6D are lateral aberration diagrams at wavelengths of 610 nm, 550 nm, and 460 nm in the respective angles of view on the reducing side. It is understood therefrom that the chromatic aberration of magnification, which is a feature of the refracting/reflecting complex optical system, becomes very small.

Figure 7:
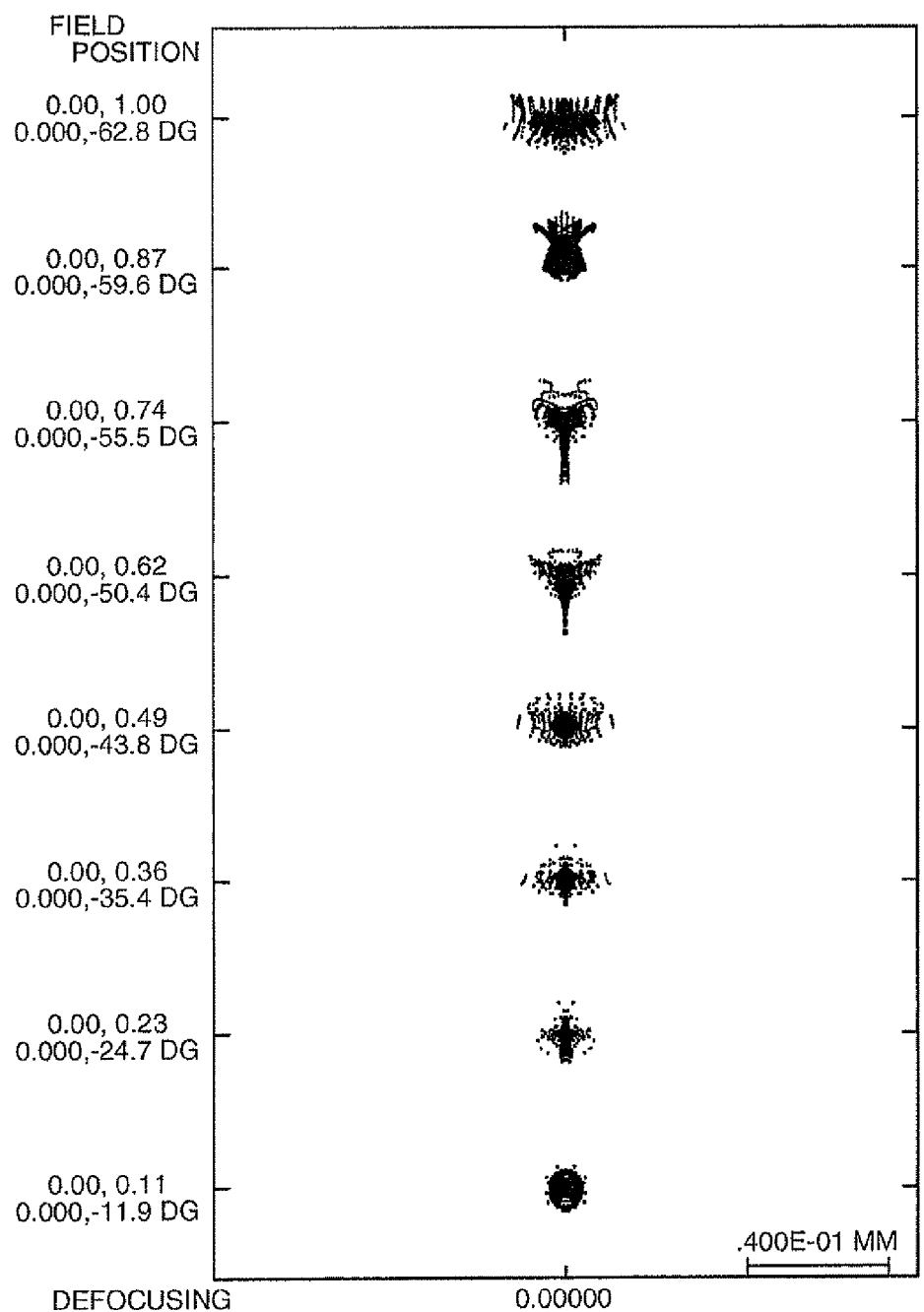
FIG. 7 is a spot diagram at wavelengths of 610 nm, 550 nm, and 460 nm in the respective angles of view on the reducing side.

FIG. 7 is a spot diagram at wavelengths of 610 nm, 550 nm, and 460 nm in the respective angles of view on the reducing side. From the position with the narrow angle of view to the position with the wide angle of view, the core portion for forming the image falls within a range of about 10 μm, and an amount of flare is also small, which shows the fact that the preferable imaging performance can be obtained.

3. Explanation of Projection Type Image Display Device

FIG. 8 is a conceptual diagram of the projection type image display device 100. The image forming optical section 60 of the projection type image display device 100 is provided with a light source device 61 for emitting homogenized source light along the system optical axis SA, an illumination separation system 63 for separating the illumination light emitted from the light source device 61 into three colors of red, green, and blue, a light modulation section 65 illuminated by the illumination light of the respective colors emitted from the illumination separation system 63, and a cross dichroic prism 67 for combining the modulated light beams of the respective colors transmitted through the light modulation section 65.

Here, the light source device 61 is provided with a light source unit 61a for emitting the source light and a homogenizing optical system 61c for converting the source light emitted from the light source unit 61a into the illumination light, which is homogenized and aligned in a predetermined polarization direction. The light source unit 61a has a light source lamp 61m and a reflector 61n. Further, the homogenizing optical system 61c is provided with a first lens array 61d for dividing the source light into partial light beams, a second lens array 61e for adjusting the diffusion of the partial light beams thus divided, a polarization conversion device 61g for aligning the polarization directions of the respective partial light beams, and a overlapping lens 61i for making the respective partial light beams enter a target illumination area in an overlapping manner.

The illumination separation system 63 is provided with first and second dichroic mirrors 63a, 63b, and mirrors 63m, 63n, and 63o for folding the light path, and branches the system light axis SA into three light paths OP1 through OP3, thereby separating the illumination light into three light beams of a blue light beam LB, a green light beam LG, and a red light beam LR. It should be noted that the relay lenses LL1, LL2 transmits the image, which is formed immediately before the first relay lens LL1 on the entrance side, substantially directly to the field lens 63h on the exit side, thereby preventing efficiency drop of the light beam caused, for example, by diffusion of the light beam.

The light modulation section 65 is provided with three liquid crystal light valves 65a, 65b, and 65c to which the three colors of the illumination light beams LB, LG, and LR are input, respectively, and performs intensity modulation pixel by pixel on the respective colored light beams LB, LG, and LR having entered the liquid crystal light valves 65a, 65b, and 65c via the field lenses 63f, 63g, and 63h, respectively, in accordance with the drive signal. It should be noted that each of the liquid crystal light valves 65a, 65b, and 65c is an image forming element having a structure of sandwiching a liquid crystal panel between a pair of polarization plates. Further, the liquid crystal panel forming each of the liquid crystal light valves 65a, 65b, and 65c is arranged to correspond to the object surface OS shown in FIG. 1 and so on.

The cross dichroic prism 67 is provided with dichroic films 67a, 67b intersecting with each other, and emits the image light obtained by combining the modulated light beams from the respective liquid crystal light valves 65a, 65b, and 65c.

The projection optical system 1 has a configuration shown in FIG. 1, and projects the image light combined by the cross dichroic prism 67 on the projection surface 10a of the screen 10 as a color image at an appropriate magnification rate and with relatively little distortion. As shown in FIGS. 8 and 9, the refracting optical section 40 and the first and second curved mirrors 21, 22 are housed in the coaxial and integrated lens tube, namely the frame 1a.

In the projection type image display device 100 explained hereinabove, since the projection optical system 1 has the configuration described above, the number of lenses constituting the projection optical system 1 can be reduced compared to the projection optical system composed only of the refracting optical section, while keeping the very wide angle of view of, for example, equal to or larger than 60 degree in the half angle of view. Further, it is also possible to reduce the maximum outside dimension thereof including the reflecting optical surfaces 21a, 22a of the first and second curved mirrors 21, 22. Thus, the configuration, which can be incorporated in the coaxial frame 1a similarly to the ordinary refracting optical section, can be achieved. Therefore, the assembling accuracy of the projection optical system 1 can be improved. Further, a certain level of angle of view can be covered by the refracting optical section 40 while suppressing the aberration therein. Therefore, the lens configuration and so on of the refracting optical section 40 can be simplified, and the projection optical system 1, consequently the projection type image display device 100, which is compact and can be reduced in cost, can be achieved.

Second Embodiment

Figure 10:
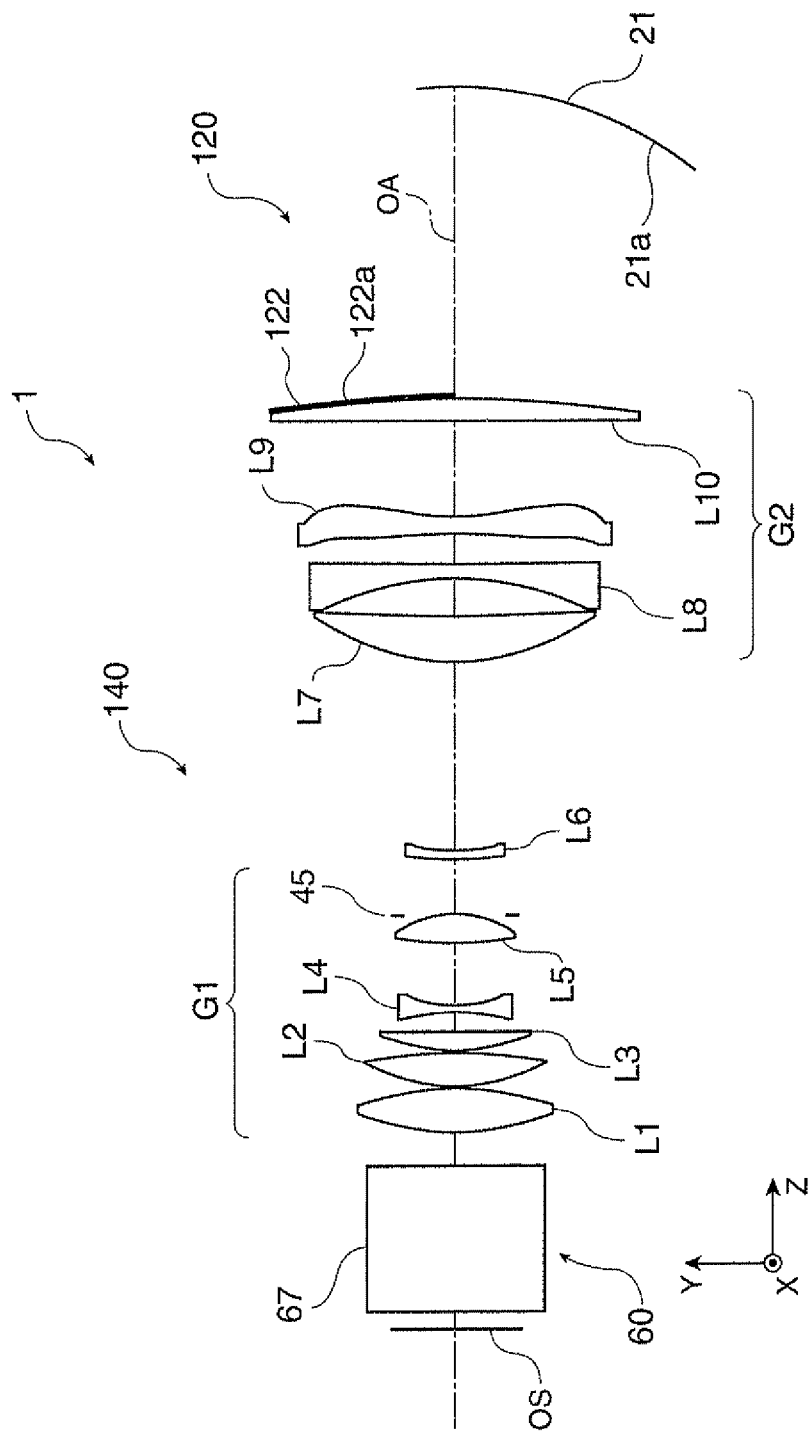
FIG. 10 is a diagram for explaining a configuration of a substantial part of a projection type image display device according to a second embodiment.
Figure 11:
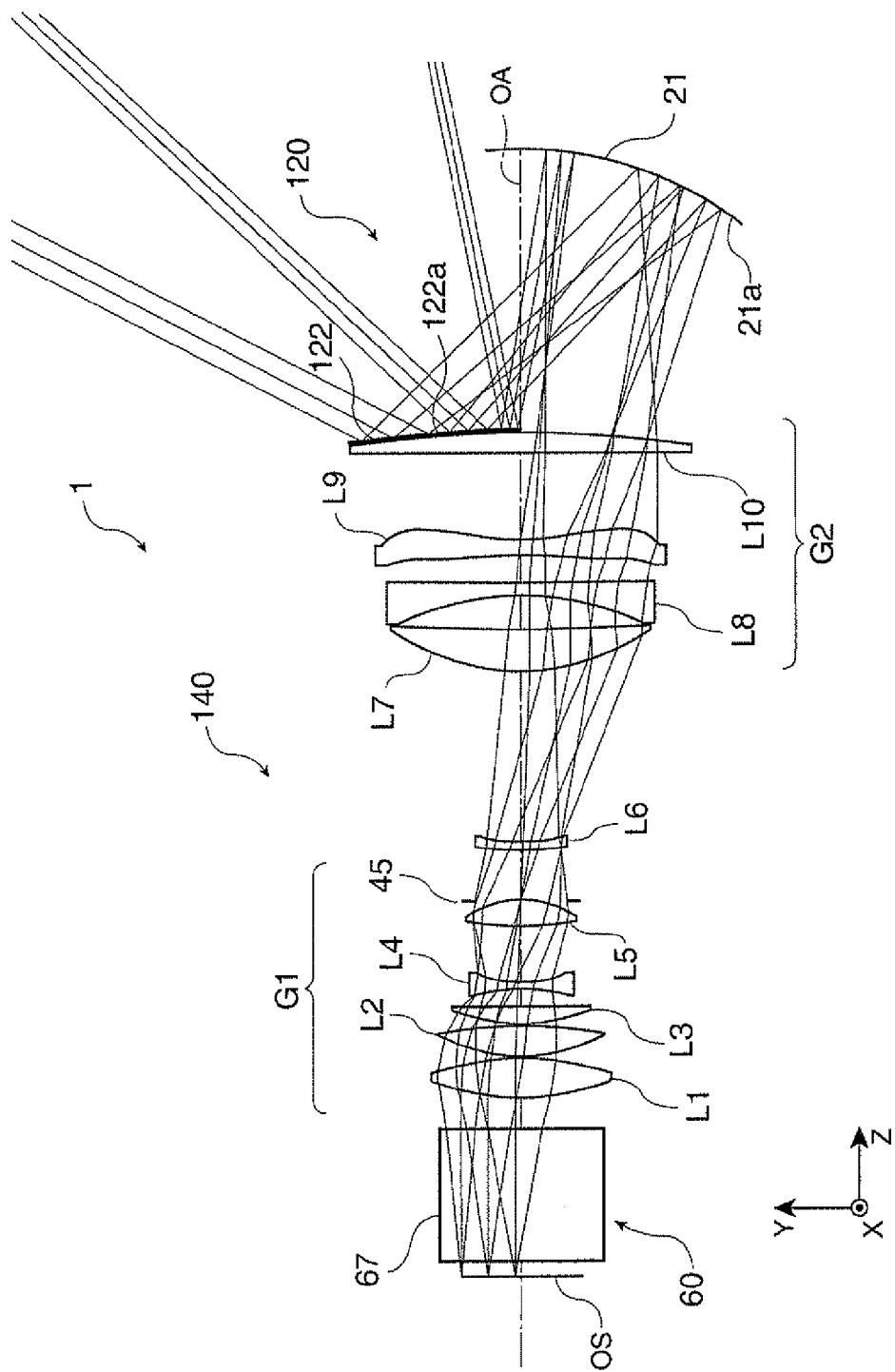
FIG. 11 is a diagram showing a state of the light beams in FIG. 10.

FIGS. 10 and 11 are side views showing a substantial part of the projection type image display device according to a second embodiment of the invention. Here, FIG. 10 shows a configuration of the substantial part of the projection type image display device, and FIG. 11 shows a state of the light beams in the optical system shown in FIG. 10. The projection type image display device 100 according to the present embodiment is obtained by modifying the projection type image display device 100 of the first embodiment shown in FIG. 1 and so on, and the sections not particularly explained have the same structure as the projection type image display device 100 of the first embodiment.

1. Explanation of Projection Optical System

As shown in FIG. 10 and so on, the projection optical system 1 is provided with a refracting optical section 140 and an output optical section 120. The refracting optical section 140 of the projection optical system 1 is provided with the first lens group G1, the second lens group G2, and the aperture 45 similarly to the first embodiment. The output optical section 120 is disposed on the exit side of the refracting optical section 140, and is provided with the first curved mirror 21 as the first reflecting optical section and a second curved mirror 122 as the second reflecting optical section.

Hereinafter, a specific lens configuration of the refracting optical section 140, and so on will be explained.

In the refracting optical section 140, the first lens group G1 is composed of the first lens L1, the second lens L2, the third lens L3, the fourth lens L4, the fifth lens L5, and the sixth lens L6, as shown in FIG. 10 and so on. The second lens group G2 is composed of the seventh lens L7, the eighth lens L8, the ninth lens L9, and the tenth lens L10.

The lenses L1 through L6 of the first lens group G1 are disposed in order from the first lens L1 to the sixth lens L6 in the direction from the reducing side toward the magnifying side. The lenses L7 through L10 of the second lens group G2 are also disposed in order from the seventh lens L7 to the tenth lens L10 in the direction from the reducing side toward the magnifying side. The aperture 45 is disposed between the fifth lens L5 of the first lens group G1 and the sixth lens L6 thereof.

The first lens L1 and the second lens L2 of the constituent lenses of the refracting optical section 140 are each a biconvex lens. Among these lenses, the entrance surface of the first lens L1 is an aspherical surface. Still further, the third lens L3 is a meniscus lens having a convex surface on the entrance side and a concave surface on the exit side. Further, the fourth lens L4 is a biconcave lens. Still further, the fifth lens L5 is an aspheric biconvex lens. Still further, the sixth lens L6 and the seventh lens L7 are each a meniscus lens having a convex surface on the entrance side and a concave surface on the exit side. Further, the eighth lens L8 and the ninth lens L9 are each a biconcave lens. Among these lenses, the ninth lens L9 is an aspherical lens. Still further, the tenth lens L10 is a plano-convex lens having a flat surface on the entrance side and a convex surface on the exit side. According to the configuration of the lenses L1 through L10 described above, the first lens group G1 has positive power, and the second lens group G2 has negative power. The arrangement of the lenses L1 through L10 is adjusted so that the optimum enlarged projection on the screen 10 (see FIG. 2) can be performed in relation to the shape, arrangement, and so on of the output optical section 120 as shown in FIG. 10 and so on.

Hereinafter, a specific configuration of the output optical section 120, and so on will be explained.

As shown in FIG. 10, the first and second curved mirrors 21, 122 are disposed coaxially around the optical axis OA. The first curved mirror 21 is a rotationally symmetrical surface having the optical axis OA as the axis of symmetry, and has a reflecting optical surface 21a as a concave aspherical surface having positive power. The second curved mirror 122 is a rotationally symmetrical surface having the optical axis OA as the axis of symmetry, and has a reflecting optical surface 122a (the portion illustrated by a thick line in FIG. 10 and so on), which is a convex spherical surface having negative power, on the upper half thereof (the portion located in the +Y direction from the XZ plane passing through the optical axis OA) from the optical axis OA. The second curved mirror 122 is integrated with a part of the tenth lens L10 on the most magnifying side of the refracting optical section 140 described above. The reflecting optical surface 122a of the second curved mirror 122 also forms the reducing side surface of the tenth lens L10, and is formed as a first-surface mirror. In other words, the lower half portion (the portion located in the −Y direction from the XZ plane passing through the optical axis OA) of the tenth lens L10 from the optical axis OA functions as the lens constituting the refracting optical section 140, and the upper half portion of the tenth lens L10 from the optical axis OA functions as the convex mirror constituting the output optical section 120. It should be noted that the second curved mirror 122 is formed by coating the magnifying side surface of the tenth lens L10 with a reflecting material such as aluminum.

The first and second curved mirrors 21, 122 have substantially the same effective radius, and are housed in the coaxial integrated frame 1a as shown in FIGS. 8 and 9.

2. Specific Example of Projection Optical System

Table 3 shows lens data and so on of a specific example of the projection optical system 1.

TABLE 3

| SURFACE NUMBER | | R | D | Nd | vd | |
|---|---|---|---|---|---|---|
| 0 | | ∞ | 3.000 | | | IMAGE DISPLAY ELEMENT |
| 1 | | ∞ | 25.750 | 1.51633 | 64.14 | PRISM |
| 2 | | ∞ | 6.000 | | | |
| 3 | * | 34.646 | 7.742 | 1.48749 | 70.44 | |
| 4 | | −45.524 | 0.200 | | | |
| 5 | | 30.814 | 6.000 | 1.49700 | 81.54 | |
| 6 | | −83.429 | 0.441 | | | |
| 7 | | 33.220 | 3.200 | 1.48749 | 70.44 | |
| 8 | | 4475.467 | 3.713 | | | |
| 9 | | −33.516 | 1.200 | 1.84666 | 23.78 | |
| 10 | | 21.320 | 10.852 | | | |
| 11 | * | 44.467 | 5.000 | 1.58144 | 40.89 | |
| 12 | * | −19.115 | 0.100 | | | |
| APERTURE | | ∞ | 10.000 | | | |
| 14 | | 87.432 | 1.400 | 1.62041 | 60.34 | |
| 15 | | 28.352 | 33.372 | | | |
| 16 | | 40.182 | 8.000 | 1.83500 | 42.98 | |
| 17 | | 417.603 | 6.700 | | | |
| 18 | | −48.631 | 2.500 | 1.80518 | 25.46 | |
| 19 | | 2158.250 | 5.387 | | | |
| 20 | * | −59.481 | 3.000 | 1.53116 | 56.05 | |
| 21 | * | 46.782 | 16.894 | | | |
| 22 | | ∞ | 4.000 | 1.51680 | 64.20 | |
| 23 | | −199.543 | 55.000 | | | |
| 24 | * | −62.218 | −55.000 | | | FIRST REFLECTING SURFACE |
| 25 | | −199.543 | 750.000 | | | SECOND REFLECTING SURFACE |
| 26 | | ∞ | | | | SCREEN |

| ASP | k | A04 | A06 | A08 | A10 | A12 |
|---|---|---|---|---|---|---|
| R3 | 0.00000E+00 | −1.62611E−05 | 8.25232E−09 | −9.50332E−12 | 0.00000E+00 | 0.00000E+00 |
| R11 | 0.00000E+00 | −1.34220E−05 | −2.17122E−10 | 5.06020E−11 | 0.00000E+00 | 0.00000E+00 |
| R12 | −8.24172E+00 | −3.94007E−06 | −2.19700E−08 | 0.00000E+00 | 0.00000E+00 | 0.00000E+00 |
| R20 | −1.00000E+00 | 3.43174E−05 | −5.68307E−08 | 3.26772E−11 | −1.32439E−14 | −2.92802E−18 |

TABLE 3-continued

| | | | | | | |
|---|---|---|---|---|---|---|
| R21 | −1.00000E+00 | −1.30698E−05 | 1.15533E−08 | −7.58439E−11 | 1.05430E−13 | −5.50590E−17 |
| R24 | −4.04298E−00 | −1.89607E−08 | 7.46391E−11 | −7.14500E−14 | 2.11869E−17 | −1.82830E−21 |

In the present specific example, although the lenses L1 through L10 are each basically formed of spherical surfaces, the entrance surface (the 3rd surface in Table 3) of the first lens L1, the entrance and exit surfaces (the 11th surface and 12th surface in Table 3) of the fifth lens L5, and the entrance and exit surfaces (the 20th surface and 21st surface in Table 3) of the ninth lens L9 are each formed as an aspherical surface as described above. Further, the reflecting optical surface (the 24th surface in Table 3) of the first curved mirror 21 is also formed as an aspherical surface as described above. In the case of the present specific example, the respective coefficients "k" and "A04" through "A12" in the aspheric formula (see formula 1) explained in the first embodiment are as shown in the lower part of Table 3.

Table 4 shows specific examples of the conditional expressions 1 through 4 described above.

TABLE 4

| | |
|---|---|
| F/FL | 0.367 |
| |F1/F2| | 0.207 |
| H2/H1 | 0.770 |
| DM/TL | 0.424 |

Figures 12, 12A, 12B:
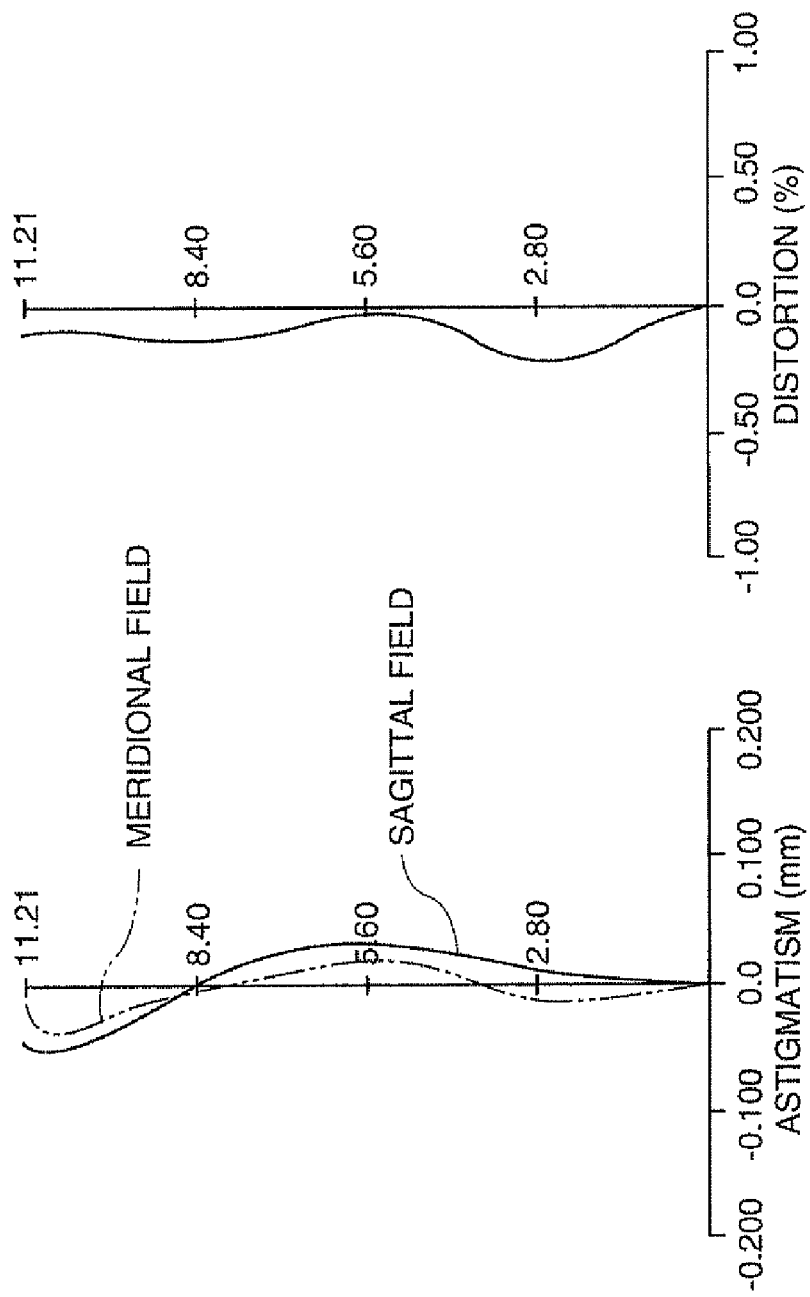
FIG. 12A is an astigmatism diagram on the reducing side.
FIG. 12B is a distortion diagram.

FIG. 12A is an astigmatism diagram on the reducing side, and FIG. 12B is a distortion diagram. As shown in FIGS. 12A and 12B, it is understood that an amount of astigmatism and an amount of distortion each have a sufficiently small and flat field, and that a preferable performance with little image distortion can be obtained.

FIGS. 13A through 13D and 14A through 14D are lateral aberration diagrams at wavelengths of 610 nm, 550 nm, and 460 nm in the respective angles of view on the reducing side. It is understood therefrom that the chromatic aberration of magnification, which is a feature of the refracting/reflecting complex optical system, becomes very small.

Figure 15:
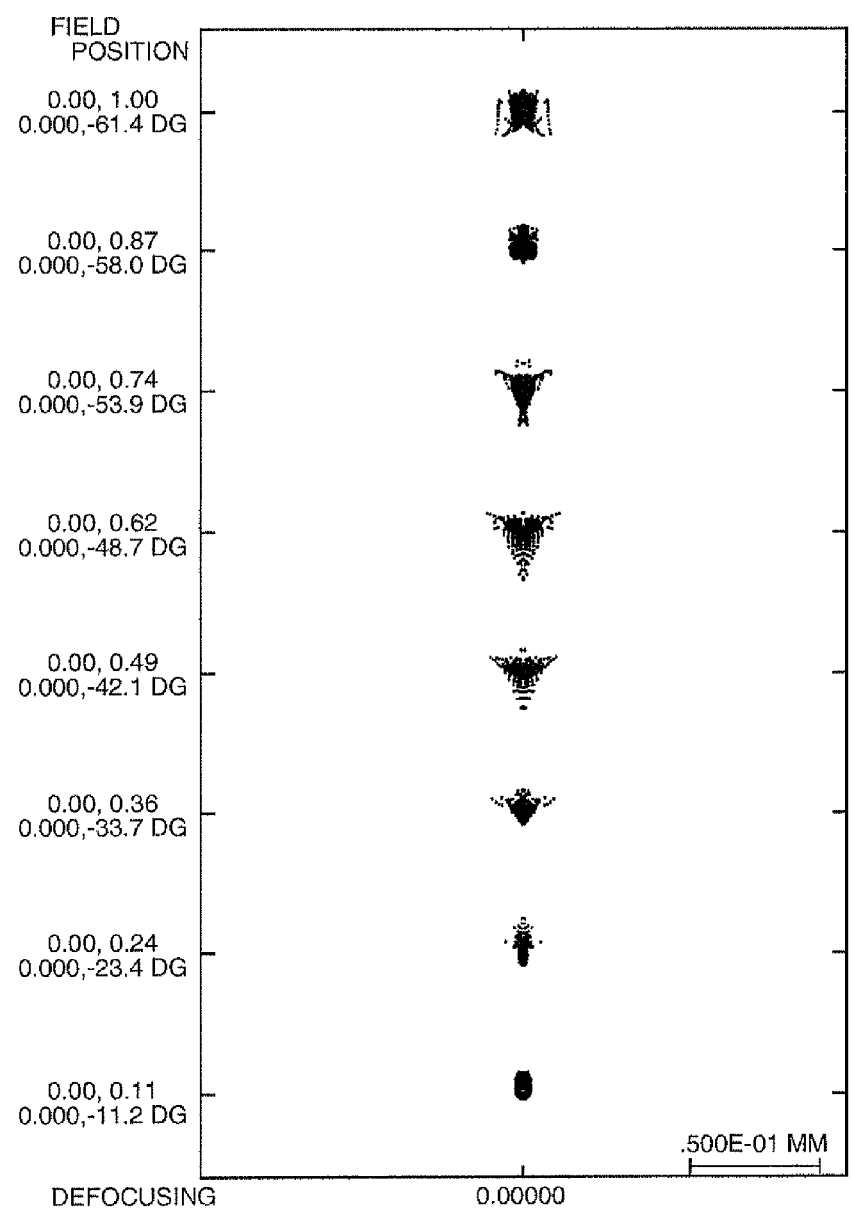
FIG. 15 is a spot diagram at wavelengths of 610 nm, 550 nm, and 460 nm in the respective angles of view on the reducing side.

FIG. 15 is a spot diagram at wavelengths of 610 nm, 550 nm, and 460 nm in the respective angles of view on the reducing side. From the position with the narrow angle of view to the position with the wide angle of view, the core portion for forming the image falls within a range of about 10 μm, and an amount of flare is also small, which shows the fact that the preferable imaging performance can be obtained.

Third Embodiment

Figure 16:
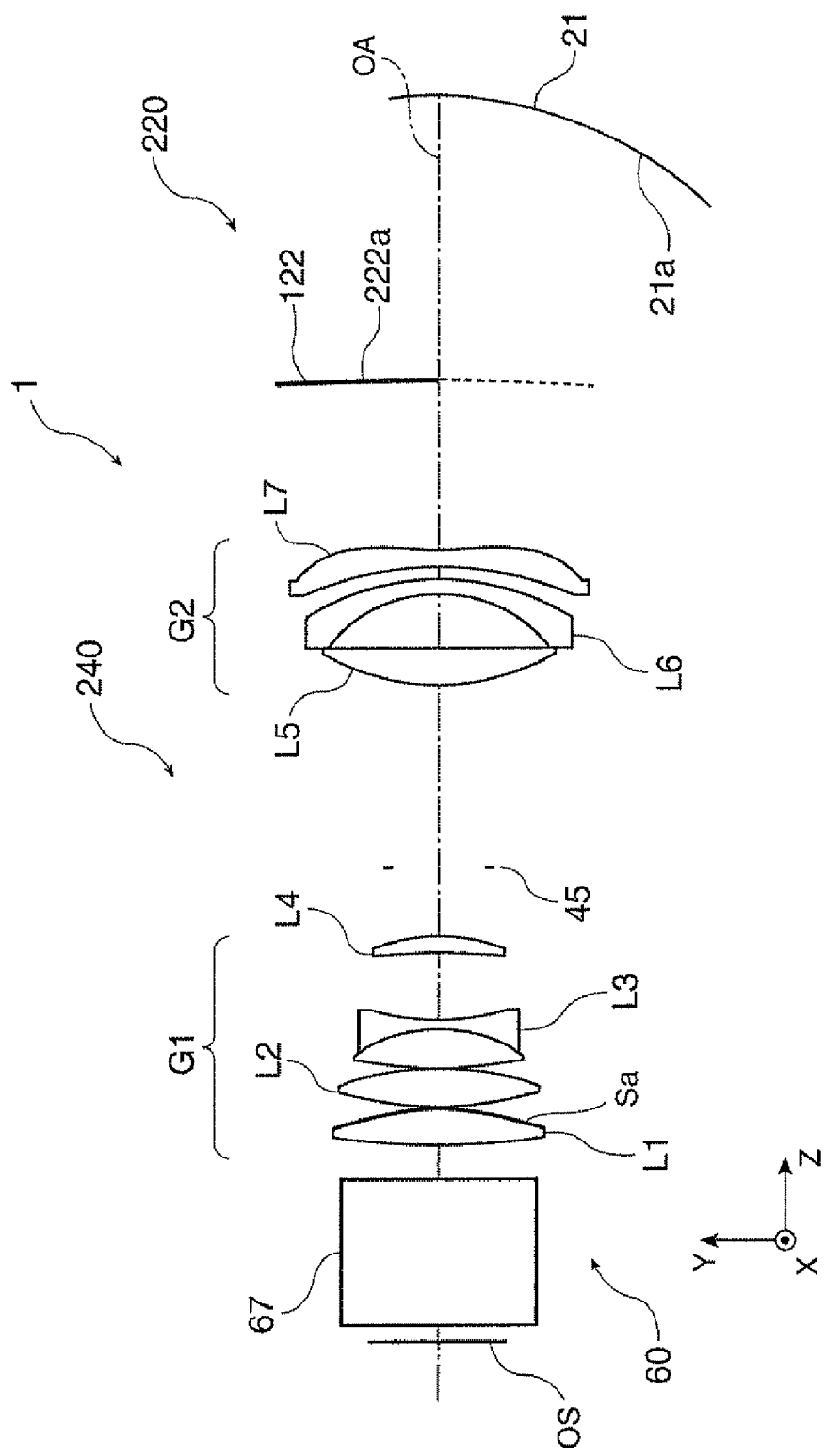
FIG. 16 is a diagram for explaining a configuration of a substantial part of a projection type image display device according to a third embodiment.
Figure 17:
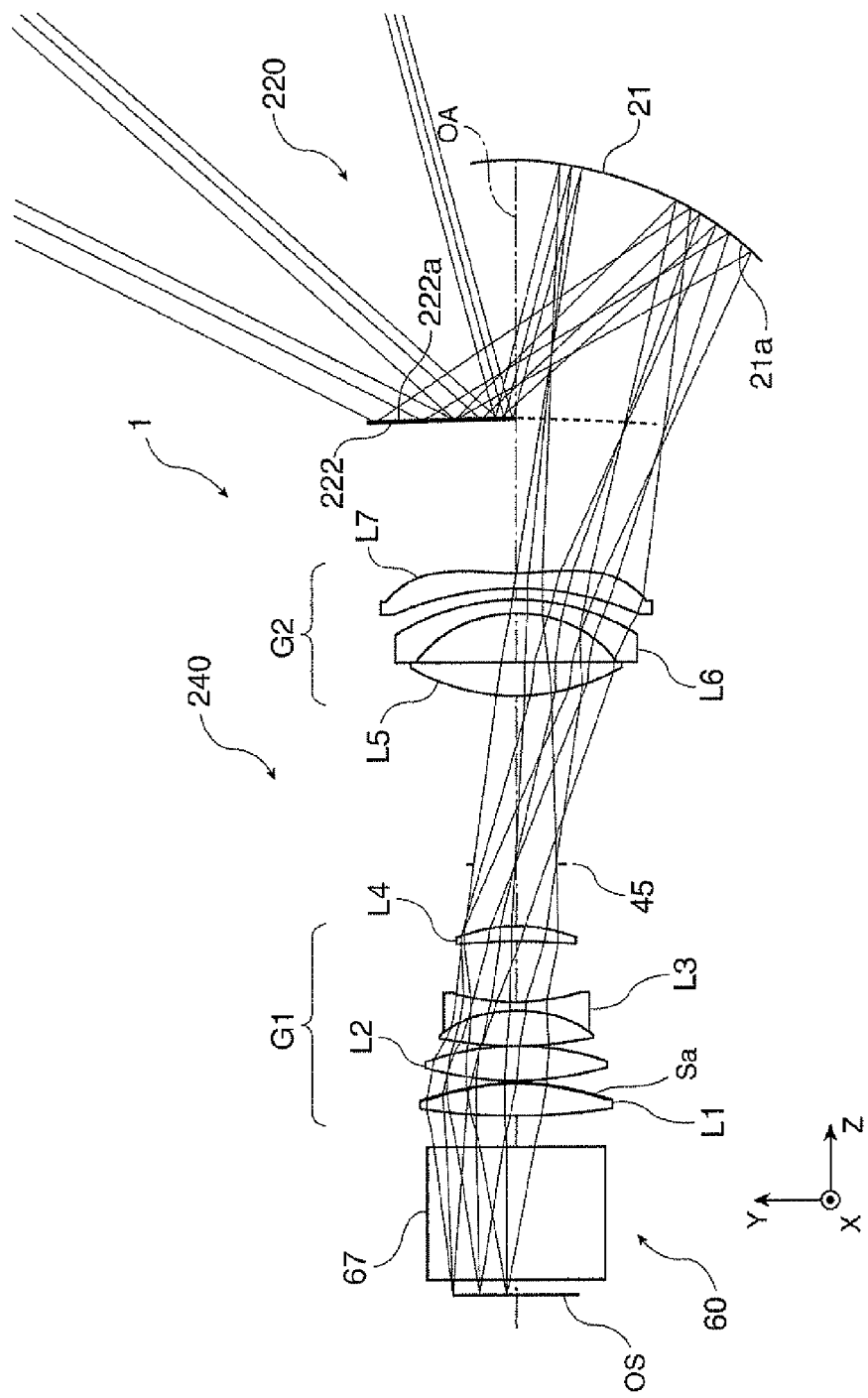
FIG. 17 is a diagram showing a state of the light beams in FIG. 16.

FIGS. 16 and 17 are side views showing a substantial part of the projection type image display device according to a third embodiment of the invention. Here, FIG. 16 shows a configuration of the substantial part of the projection type image display device, and FIG. 17 shows a state of the light beams in the optical system shown in FIG. 16. The projection type image display device 100 according to the present embodiment is obtained by modifying the projection type image display device 100 of the first embodiment shown in FIG. 1 and so on, and the sections not particularly explained have the same structure as the projection type image display device 100 of the first embodiment.

1. Explanation of Projection Optical System

As shown in FIG. 16 and so on, the projection optical system 1 is provided with a refracting optical section 240 and an output optical section 220. The refracting optical section 240 of the projection optical system 1 is provided with the first lens group G1, the second lens group G2, and the aperture 45 similarly to the first embodiment. The output optical section 220 is disposed on the exit side of the refracting optical section 240, and is provided with the first curved mirror 21 as the first reflecting optical section and a second curved mirror 222 as the second reflecting optical section.

Hereinafter, a specific lens configuration of the refracting optical section 240, and so on will be explained.

In the refracting optical section 240, the first lens group G1 is composed of the first lens L1, the second lens L2, the third lens L3, and the fourth lens L4, as shown in FIG. 16 and so on. The second lens group G2 is composed of the fifth lens L5, the sixth lens L6, and the seventh lens L7.

The lenses L1 through L4 of the first lens group G1 are disposed in order from the first lens L1 to the fourth lens L4 in the direction from the reducing side toward the magnifying side. The lenses L5 through L7 of the second lens group G2 are also disposed in order from the fifth lens L5 to the seventh lens L7 in the direction from the reducing side toward the magnifying side. The aperture 45 is disposed between the fourth lens L4 of the first lens group G1 and the fifth lens L5 of the second lens group G2.

The first lens L1 and the second lens L2 of the constituent lenses of the refracting optical section 240 are each a biconvex lens. Among these lenses, the exit side surface of the first lens L1 is provided with a thin resin layer Sa, and is formed as a complex aspherical surface. Further, the third lens L3 is a cemented lens having a convex surface on the entrance side and a concave surface on the exit side formed by combining three positive and negative lenses. Still further, the fourth lens L4 is a meniscus lens having a concave surface on the entrance side and a convex surface on the exit side. Still further, the fifth lens L5 is a plano-convex lens having a convex surface on the entrance side and a flat surface on the exit side. Still further, the sixth lens L6 is a meniscus lens having a concave surface on the entrance side and a convex surface on the exit side. Still further, the seventh lens L7 is an aspheric biconcave lens. According to the configuration of the lenses L1 through L7 described above, the first lens group G1 has positive power, and the second lens group G2 has negative power. The arrangement of the lenses L1 through L7 is adjusted so that the optimum enlarged projection on the screen 10 (see FIG. 2) can be performed in relation to the shape, arrangement, and so on of the output optical section 220 as shown in FIG. 16 and so on.

Hereinafter, a specific configuration of the output optical section 220, and so on will be explained.

As shown in FIG. 16, the first and second curved mirrors 21, 222 are disposed coaxially around the optical axis OA. The first curved mirror 21 is a rotationally symmetrical surface having the optical axis OA as the axis of symmetry, and has a reflecting optical surface 21a as a concave aspherical surface having positive power. The second curved mirror 222 is a rotationally symmetrical surface having the optical axis OA as the axis of symmetry, and has a reflecting optical surface 222a (the portion illustrated by a thick line in FIG. 16 and so on), which is a convex spherical surface having negative power, on the upper half thereof (the portion located in the +Y direction from the XZ plane passing through the optical axis OA) from the optical axis OA. In other words, the second curved mirror 222 is formed of a spherical first-surface mirror with the lower half thereof removed by cutting. Since the lower half of the second curved mirror 222 is removed by cutting, the light path from the refracting optical section 240 to the first curved mirror 21 passes through the lower side of the second curved mirror 222.

The first and second curved mirrors 21, 222 have substantially the same effective radius, and are housed in the coaxial integrated frame 1*a* as shown in FIGS. 8 and 9.

2. Specific Example of Projection Optical System

Table 5 shows lens data and so on of a specific example of the projection optical system 1.

TABLE 6

| F/FL | 0.369 |
|---|---|
| \|F1/F2\| | 0.390 |
| H2/H1 | 0.592 |
| DM/TL | 0.760 |

Figures 18, 18A, 18B:
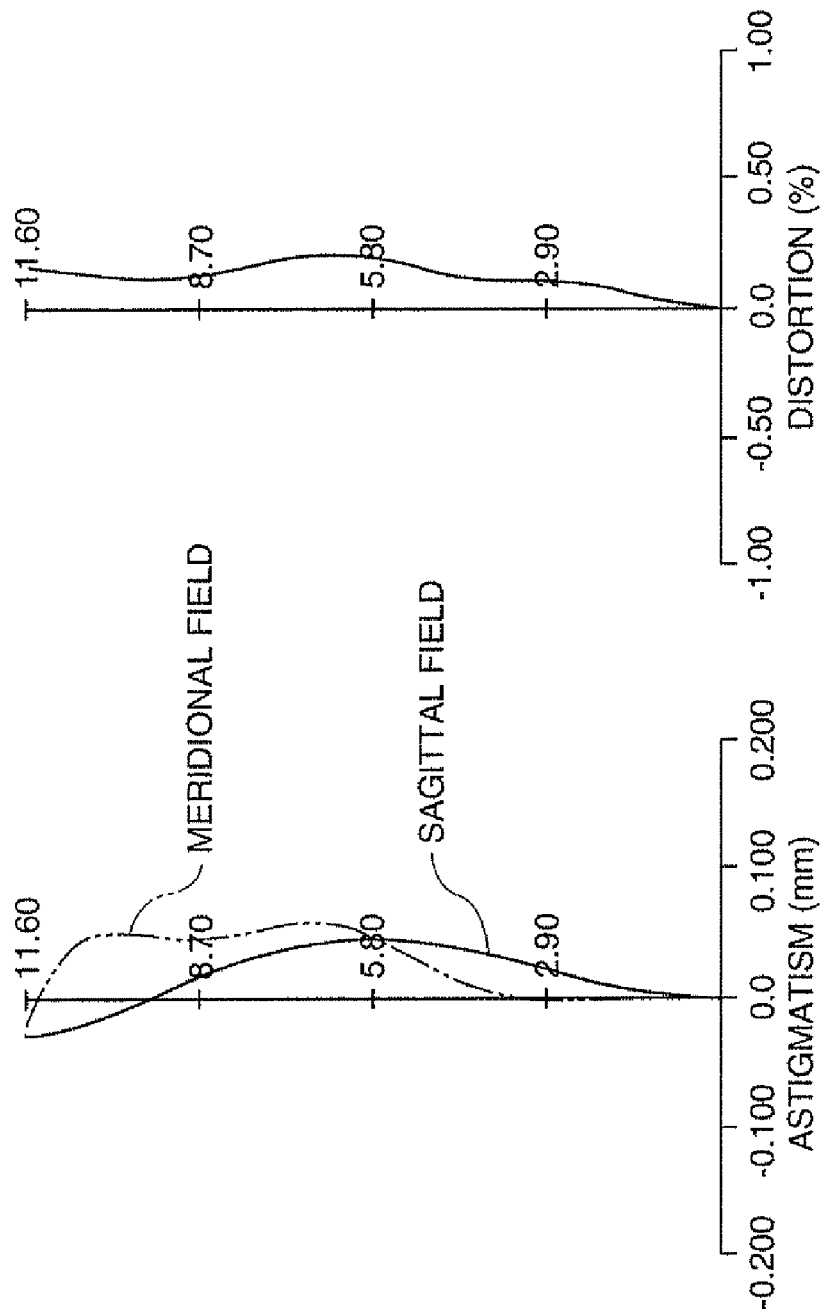
FIG. 18A is an astigmatism diagram on the reducing side.
FIG. 18B is a distortion diagram.
Figure 19A:
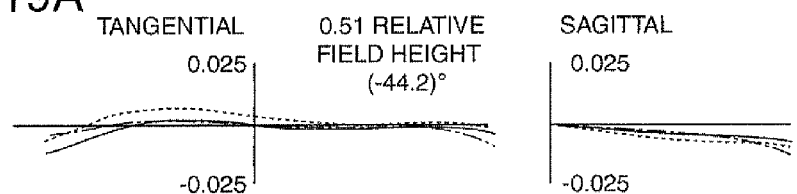
FIGS. 19A through 19D are lateral aberration diagrams at wavelengths of 610 nm, 550 nm, and 460 nm in the respective angles of view on the reducing side.
Figure 19B:
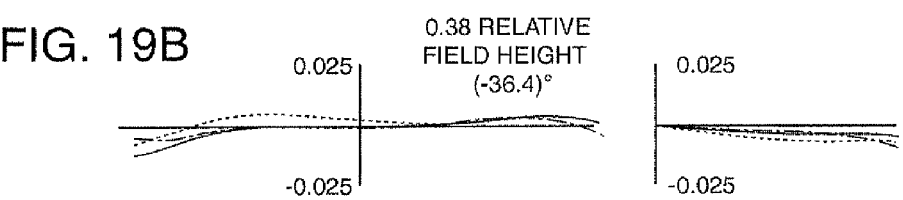
Figure 19C:
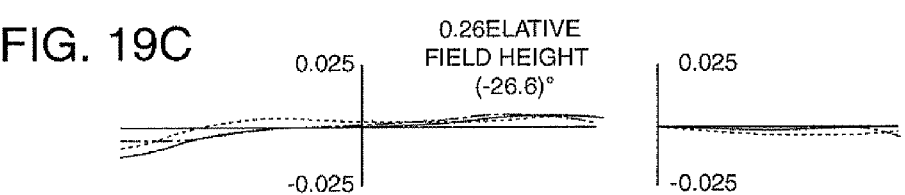
Figure 19D:
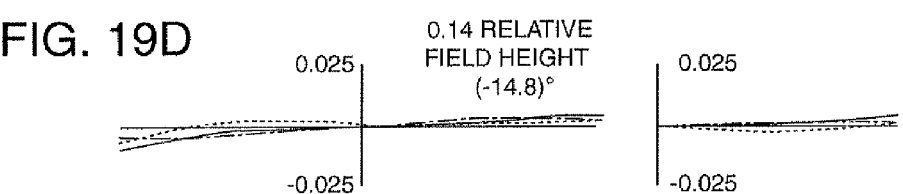

FIG. 18A is an astigmatism diagram on the reducing side, and FIG. 18B is a distortion diagram. As shown in FIGS. 18A and 18B, it is understood that an amount of astigmatism and an amount of distortion each have a sufficiently small and flat field, and that a preferable performance with little image distortion can be obtained.

FIGS. 19A through 19D and 20A through 20D are lateral aberration diagrams at wavelengths of 610 nm, 550 nm, and 460 nm in the respective angles of view on the reducing side. It is understood therefrom that the chromatic aberration of

TABLE 5

| SURFACE NUMBER | | R | D | Nd | νd | |
|---|---|---|---|---|---|---|
| 0 | | ∞ | 3.000 | | | IMAGE DISPLAY ELEMENT |
| 1 | | ∞ | 25.750 | 1.51633 | 64.14 | PRISM |
| 2 | | ∞ | 6.000 | | | |
| 3 | | 122.600 | 6.200 | 1.69680 | 55.46 | |
| 4 | | −44.762 | 0.250 | 1.51380 | 52.97 | |
| 5 | * | −35.810 | 0.200 | | | |
| 6 | | 57.282 | 6.800 | 1.49700 | 81.54 | |
| 7 | | −45.696 | 0.100 | | | |
| 8 | | 80.000 | 7.000 | 1.47849 | 70.44 | |
| 9 | | −22.188 | 1.600 | 1.84666 | 23.78 | |
| 10 | | 47.103 | 11.633 | | | |
| 11 | | −108.333 | 3.000 | 1.80518 | 25.46 | |
| 12 | | −26.224 | 12.000 | | | |
| APERTURE | | ∞ | 32.572 | | | |
| 14 | | 37.665 | 6.500 | 1.53172 | 48.84 | |
| 15 | | ∞ | 9.569 | | | |
| 16 | | −22.984 | 2.500 | 1.80518 | 25.46 | |
| 17 | | −40.072 | 2.326 | | | |
| 18 | * | −40.424 | 3.000 | 1.53116 | 56.05 | |
| 19 | * | 117.195 | 80.000 | | | |
| 20 | * | −59.377 | −50.000 | | | FIRST REFLECTING SURFACE |
| 21 | | −398.379 | 750.000 | | | SECOND REFLECTING SURFACE |
| 22 | | ∞ | | | | SCREEN |

| ASP | k | A04 | A06 | A08 | A10 | A12 |
|---|---|---|---|---|---|---|
| R5 | −1.02339E+00 | 7.42537E−06 | 2.00000E−09 | 0.00000E+00 | 0.00000E+00 | 0.00000E+00 |
| R18 | −1.00000E+00 | 8.77205E−06 | −8.86098E−09 | 2.51742E−11 | −6.63065E−14 | 4.18499E−17 |
| R19 | −1.00000E+00 | −2.46976E−05 | 1.68498E−08 | −4.95361E−11 | 7.83836E−14 | −6.30139E−17 |
| R20 | −5.52675E−01 | 6.80588E−08 | −8.26350E−11 | 4.98416E−14 | −2.65492E−17 | 4.31562E−21 |

In the present specific example, although the lenses L1 through L7 are basically formed of spherical surfaces, the exit surface (the 5th surface in Table 5) of the first lens L1 and the entrance and exit surfaces (the 18th surface and the 19th surface in Table 5) of the seventh lens L7 are formed as aspherical surfaces as described above. Further, the reflecting optical surface (the 20th surface in Table 5) of the first curved mirror 21 is also formed as an aspherical surface as described above. In the case of the present specific example, the respective coefficients "k" and "A04" through "A12" in the aspheric formula (see formula 1) explained in the first embodiment are as shown in the lower part of Table 5.

Table 6 shows specific examples of the conditional expressions 1 through 4 described above.

magnification, which is a feature of the refracting/reflecting complex optical system, becomes very small.

Figure 21:
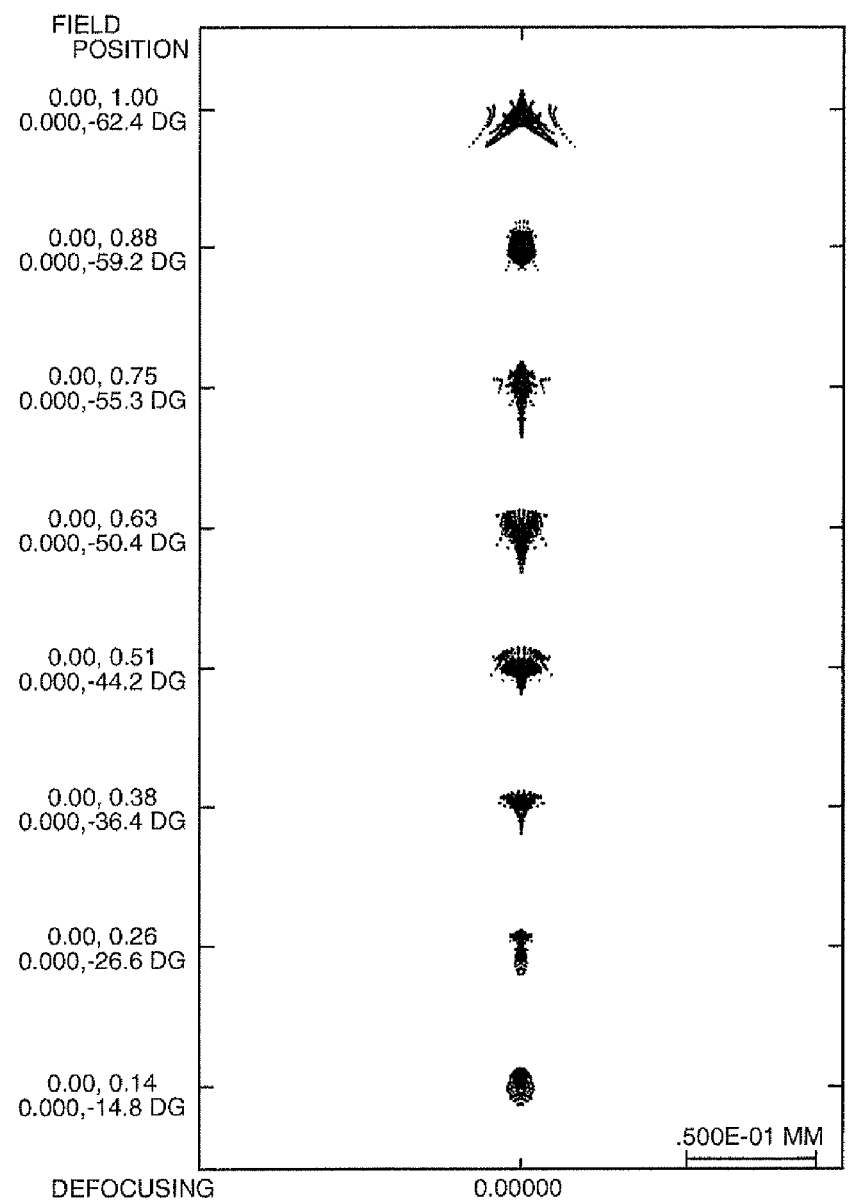
FIG. 21 is a spot diagram at wavelengths of 610 nm, 550 nm, and 460 nm in the respective angles of view on the reducing side.

FIG. 21 is a spot diagram at wavelengths of 610 nm, 550 nm, and 460 nm in the respective angles of view on the reducing side. From the position with the narrow angle of view to the position with the wide angle of view, the core portion for forming the image falls within a range of about 10 μm, and an amount of flare is also small, which shows the fact that the preferable imaging performance can be obtained.

Hereinabove, although the invention is explained along the embodiments, the invention is not limited to the embodiments described above, but can be put into practice in various forms within the scope or the spirit of the invention, and the following modifications, for example, are also possible.

Specifically, in the embodiments described above, although the liquid crystal light valves 65a, 65b, and 65c are used as the image forming elements in the image forming optical section 60, it is also possible to use a light modulation device such as a device having the pixels formed of micromirrors, or an image forming section such as a film or a slide.

Although in the embodiments described above the projection type image display device 100 is disposed on the lower side of the screen 10, it is also possible to dispose the projection type image display device 100 on the upper side of the screen 10 by turning the projection type image display device 100 upside down.

Further, it is also possible in the embodiments described above to dispose a planar light path folding mirror inside the projection optical system 1. Thus, the freedom of the housing space for the projection optical system 1 can be enhanced.

The entire disclosure of Japanese Patent Application No. 2009-031018, filed Feb. 13, 2009 is expressly incorporated by reference herein.

What is claimed is:

1. A projection optical system comprising:
    a refracting optical section composed mainly of a plurality of lenses, and having positive power;
    a first reflecting optical section having a concave reflecting optical surface; and
    a second reflecting optical section having a convex reflecting optical surface, the refracting optical section, the first reflecting optical section and the second reflecting optical section being disposed in order from a reducing side,
    wherein the projection optical system satisfies the following conditional expression, denoting a focal length of a total system combining the refracting optical section, the first reflecting optical section, and the second reflecting optical section as F, and a focal length of the refracting optical section as FL:

$$0.2 < F/FL < 0.5 \qquad (1).$$

2. The projection optical system according to claim 1, wherein
    the refracting optical section is mainly composed of a first lens group having positive power and a second lens group having negative power disposed across a largest interval in the refracting optical section in order from the reducing side, and satisfies the following conditional expression, denoting a focal length of the first lens group as F1, and a focal length of the second lens group as F2:

$$0.0 < |F1/F2| < 0.8 \qquad (2).$$

3. The projection optical system according to claim 1, wherein
    the convex reflecting optical surface of the second reflecting optical section is a spherical surface.

4. The projection optical system according to claim 1, wherein
    the convex reflecting optical surface of the second reflecting optical section also forms a surface of a lens constituting a part of the refracting optical section.

5. The projection optical system according to claim 1, wherein
    the projection optical system satisfies the following conditional expression, denoting a maximum effective radius of the first reflecting optical section as H1, and a maximum effective radius of the second reflecting optical section as H2:

$$0.4 < H2/H1 < 1.2 \qquad (3).$$

6. The projection optical system according to claim 1, wherein
    at least the first reflecting optical section and the second reflecting optical section are incorporated in a coaxial frame.

7. The projection optical system according to claim 1, wherein
    the projection optical system satisfies the following conditional expression, denoting a total length of the refracting optical section as TL, and a distance between the refracting optical section and the first reflecting optical section as DM:

$$0.3 < DM/TL < 1.0 \qquad (4).$$

8. The projection optical system according to claim 1, wherein
    the reducing side of the refracting optical section is configured to be substantially telecentric.

9. A projection type image display device comprising:
    the projection optical system according to claim 1; and
    an image forming optical section disposed on the light path of the refracting optical section at an anterior stage of the refracting optical section.

10. The projection type image display device according to claim 9, wherein
    the refracting optical section is mainly composed of a first lens group having positive power and a second lens group having negative power disposed across a largest interval in the refracting optical section in order from the reducing side, and satisfies the following conditional expression, denoting a focal length of the first lens group as F1, and a focal length of the second lens group as F2:

$$0.0 < |F1/F2| < 0.8 \qquad (2).$$

11. The projection type image display device according to claim 9, wherein
    the convex reflecting optical surface of the second reflecting optical section is a spherical surface.

12. The projection type image display device according to claim 9, wherein
    the convex reflecting optical surface of the second reflecting optical section also forms a surface of a lens constituting a part of the refracting optical section.

13. The projection type image display device according to claim 9, wherein
    the projection optical system satisfies the following conditional expression, denoting a maximum effective radius of the first reflecting optical section as H1, and a maximum effective radius of the second reflecting optical section as H2:

$$0.4 < H2/H1 < 1.2 \qquad (3).$$

14. The projection type image display device according to claim 9, wherein
at least the first reflecting optical section and the second reflecting optical section are incorporated in a coaxial frame.

15. The projection type image display device according to claim 9, wherein
the projection optical system satisfies the following conditional expression, denoting a total length of the refracting optical section as TL, and a distance between the refracting optical section and the first reflecting optical section as DM:

$$0.3 < DM/TL < 1.0 \qquad (4).$$

16. The projection type image display device according to claim 9, wherein
the reducing side of the refracting optical section is configured to be substantially telecentric.

* * * * *